US010163534B2

(12) United States Patent
Hackett et al.

(10) Patent No.: US 10,163,534 B2
(45) Date of Patent: Dec. 25, 2018

(54) MODELING FOR FUEL ELEMENT DEFORMATION

(71) Applicant: TerraPower, LLC, Bellevue, WA (US)

(72) Inventors: Micah Hackett, Seattle, WA (US); Ryan Latta, Bellevue, WA (US); Samuel J. Miller, Seattle, WA (US); Gary Povirk, Niskayuna, NY (US); Mark R. Werner, Bellevue, WA (US); Cheng Xu, Kirkland, WA (US)

(73) Assignee: TerraPower, LLC, Bellevue, WA (US)

( * ) Notice: Subject to any disclaimer, the term of this patent is extended or adjusted under 35 U.S.C. 154(b) by 883 days.

(21) Appl. No.: 14/605,831

(22) Filed: Jan. 26, 2015

(65) Prior Publication Data
US 2016/0379726 A1 Dec. 29, 2016

Related U.S. Application Data

(60) Provisional application No. 61/932,145, filed on Jan. 27, 2014.

(51) Int. Cl.
G21D 3/00 (2006.01)
G21C 3/04 (2006.01)
(Continued)

(52) U.S. Cl.
CPC ............... *G21D 3/001* (2013.01); *G21C 3/02* (2013.01); *G21C 3/04* (2013.01); *G21C 3/06* (2013.01);
(Continued)

(58) Field of Classification Search
CPC ... G06G 7/54; G21C 3/02; G21C 3/04; G21C 3/06; G21D 3/001
See application file for complete search history.

(56) References Cited

U.S. PATENT DOCUMENTS 5,094,804 A 3/1992 Schweitzer
5,887,044 A * 3/1999 Crawford ............... G21C 3/16
376/409
(Continued)

FOREIGN PATENT DOCUMENTS

CN 102460590 A 5/2012
WO WO 2012/138972 10/2012
(Continued)

OTHER PUBLICATIONS

Z.Y. Yan et. al., Numerical Characterization of Porous Solids and Performance Evaluation of Theoretical Models via the Precorrected—FFT Accelerated BEM, CMES, vol. 55, No. 1, pp. 33-60, 2010.*
(Continued)

*Primary Examiner* — Aniss Chad
*Assistant Examiner* — Justin C Mikowski
(74) *Attorney, Agent, or Firm* — Lee & Hayes, PC

(57) ABSTRACT

A computerized system for modeling reactor fuel element and fuel design to determine the thermo-mechanical performance thereof includes a processor coupled to memory, the memory configuring the processor to execute a fuel element analysis and an output configured to communicate data that describes the thermo-mechanical performance of the fuel element and fuel design based on the fuel element performance analysis. The processor is configured to estimate the mechanical behavior of a fuel by creating separate variables for the open and closed porosity components, conducting a routine for the open and closed porosity components that processes the current state of the fuel and updates the current state and forces of each of the open and closed porosity components, and combining the updates for the current state and forces according to a weighting; and estimate the creep and swelling behavior of a cladding.

22 Claims, 12 Drawing Sheets

(51) Int. Cl.
G21C 3/02 (2006.01)
G21C 3/06 (2006.01)
(52) U.S. Cl.
CPC . *G21C 2003/045* (2013.01); *G21D 2003/004* (2013.01); *G21Y 2004/30* (2013.01); *Y02E 30/40* (2013.01)

(56) References Cited

U.S. PATENT DOCUMENTS

| | | | | |
|---|---|---|---|---|
| 6,535,568 | B1* | 3/2003 | Reese | G21D 3/001 376/245 |
| 7,666,463 | B1* | 2/2010 | Youchison | G21C 3/58 427/226 |
| 8,553,829 | B2* | 10/2013 | Farawila | G21C 7/00 376/207 |
| 9,424,276 | B2 | 8/2016 | Krishna et al. | |
| 2009/0080585 | A1 | 3/2009 | Farawila | |
| 2009/0080592 | A1 | 3/2009 | Arsenlis et al. | |
| 2009/0252283 | A1 | 10/2009 | Ahlfeld et al. | |
| 2009/0315227 | A1* | 12/2009 | Ferrier | C04B 35/482 264/632 |
| 2010/0303193 | A1* | 12/2010 | Walters | G21C 3/02 376/412 |
| 2012/0257707 | A1* | 10/2012 | Ahlfeld | G21C 3/16 376/409 |
| 2013/0208848 | A1* | 8/2013 | Zabiego | G21C 7/08 376/338 |
| 2013/0345983 | A1* | 12/2013 | Guo | E21B 47/0005 702/8 |

FOREIGN PATENT DOCUMENTS

| | | |
|---|---|---|
| WO | WO 2013/026851 | 2/2013 |
| WO | WO2015/112984 | 7/2015 |

OTHER PUBLICATIONS

Marchal et. al., Finite element simulation of Pellet-Cladding Interaction (PCI) in nuclear fuel rods, Computational Materials Science 45 (2009) 821-826.*
Roy W. Rice, Porosity of Ceramics, Marcel Dekker, Inc., 1998, 79-84.*
Alicia Denis et. al., Simulation of pellet-cladding thermomechanical interaction and fission gas release, Nuclear Engineering and Design 223 (2003) 211-229.*
Ram Devanathan et. al., Modeling and simulation of nuclear fuel materials, The Royal Society of Chemistry 2010, Energy & Environmental Science Published on Jul. 12, 2010, Energy Environ. Sci., 2010, 3, 1406-1426.*
A. S. Gontar. et. al., Thermionic Fuel Element With a Gas Removal System in the Form of End Porous Pellets Within Uranidm Dioxide Core, State Research Institute of Scientific Industrial Association LUTCH, Podolsk, Russia, 474-478.*
M. J. Hackett et. al., HT9 Strain Modeling for Fuel Pin Deformation, Proceedings of the 2014 22nd International Conference on Nuclear Engineering ICONE22 Jul. 7-11, 2014, Prague, Czech Republic, Copyright © 2014 by ASME, 1-6.*
Realistic Simulation Assists Nuclear Power Plant Certification, simulia.com, Insights Jan./Feb. 2009, 12-13.*
Giuliano M. Laudone et. al., Characterisation of the porous structure of Gilsocarbon graphite using pycnometry, cyclic porosimetry and void-network modeling, Carbon 73 (2014) 61-70.*
Accelerate Safe Adoption of Nuclear Energy, Simulia, Copyright Dassault Systèmes, 2009, 1-2.*
International Search Report and Written Opinion dated Apr. 27, 2015 in connection with International Application No. PCT/US2015/012925.
International Preliminary Report on Patentability dated Aug. 11, 2016 in connection with International Application No. PCT/US2015/012925.

AFCI Materials Handbook, Rev. 4, Chapter 18: Design Properties of HT9 and Russian Ferritic/Martensitic Steels (2006).
Amodeo et al., "Constitutive Design Equations for Thermal Creep Deformation of HT-9, Fusion Engineering and Plasma Physics Program," Univ. of California—Los Angeles, vol. 122 & 123, pp. 91-95 (1984).
Bates, J.F. et al., "Effects of stress on swelling in 316 stainless steel," J. Nucl. Mater., vol. 71, pp. 286-291 (1978).
Bates, J.F. et al., "Experimental evidence for stress enhanced swelling," J. Nucl. Mater., vol. 59, pp. 95-102 (1976).
Beck, W.N. et al., "The Irradiation Behavior of High Burnup Uranium-Plutonium Alloy Prototype Fuel Elements," Argonne National Laboratory, ANL Report No. ANL-7388 (1968).
Billone, M.C. et al., "Status of Fuel Element Modeling Codes for Metallic Fuels," Proc. ANS Conf. Reliable Fuels for LMRs, Tuscson (1986).
Brager, H.R. et al., "The effect of stress on the microstructure of neutron irradiated type 316 stainless steels," J. Nucl. Mater., vol. 66, pp. 301-321 (1977).
Brailsford, A.D. et al., "Irradiation creep due to the growth of interstitial loops," Philos. Mag., vol. 27, p. 49 (1973).
Chang, Y.I. et al., "Integral Fast Reactor Program Annual Progress Repot FY 1992," Argonne National Laboratory, Report No. ANL-IFR-202 (Jun. 1993).
Chin, B.A., "An analysis of the creep properties of a 12Cr-1Mo-W-V Steel," Topical Conference on Ferritic Alloys for Use in Nuclear Energies Technologies, The Metallurgical Society of AIME, Snow Bird Utah(1984).
Cocks, A.C.F., "Inelastic Deformation of Porous Materials," J. Mech. Phys. Solids, vol. 37 (1989).
Cohen, A.B. et al., "Fuellcladding compatibility in U-19Pu-10Zr/HT9-clad fuel at elevated temperatures," J. Nucl. Mater., vol. 204, pp. 244-251 (1993).
Crawford, D.C. et al., "Large-diameter, high-plutonium metallic fuel testing in EBR-II," ANS Transaction, vol. 71 (1994).
Duva, J.M. et al., "The Densification of Powders by Power-Law Creep During Hot Isostatic Pressing," Acta metall. mater. vol. 40, No. 1, pp. 31-35 (1992).
Fenske, G.R. et al., "Fission Gas Retention and Axial Expansion of Irradiated Metallic Fuels," Argonne National Laboratory, Paper No. ANL Report CONF-860931-15 (1986).
Garner, F.A. et al., "Irradiation creep and swelling of the fusion heats of PCA, HT9 and 9Cr-1Mo irradiated to high neutron fluence," J. Nucl. Mater., vol. 179-181, pp. 577-580 (Mar. 1991).
Gelles, D.S., "Microstructural examination of commercial ferritic alloys at 200 dpa," J. Nucl. Mater., vol. 233-237, pp. 293-298 (1996).
Gelles, D.S., et al., Microstructural examination of HT-9 and 9Cr-1Mo Contained in the AD-2 Experiments, pp. 434-387, (1982).
Gittus, J.H. et al., "On the Possibility that Cottrell Creep Occurs when Non-Fissile Materials such as Stainless Steel are Irradiated in a Fast Reactor," Proc. Conf. Irradiat. Embrittlement and Creep in Fuel Cladding and Core Components, British Nuclear Energy Society (1972).
Gurson, A.L., "Continuum Theory of Ductile Rupture by Void Nucleation and Growth: Part I—Yield Criteria and Flow Rules for Porous Ductile Media," J. Eng. Mater. & Tech (1977).
Hofman, G.L. et al., "Chemical interaction of metallic fuel with austenitic and ferritic stainless steel cladding," International Conference on Reliable Fuels for Liquid Metal Reactors, Tucson, Arizona (Sep. 7-11, 1986).
Hofman, G.L. et al., "Metallic fast reactor fuels," Progress in Nuclear Energy, vol. 31 (1997).
International Search Report and Written Opinion; International App. No. PCT/US2015/012925; dated Jul. 30, 2015.
Karahan, A., "Modeling of thermo-mechanical and irradiation behavior of metallic and oxide fuels for sodium fast reactors," PhD Thesis, Massachusetts Institute of Technology (2009).
Keiser, D.D., "Fuel-cladding interaction layers in irradiated U—Zr and U—Pu Zr Fuel Elements," Argonne National Laboratory, Report No. ANL-NT-240 (2006).
Kim, Y.S. et al., Migration of minor actinides and lanthanides in fast reactor metallic fuel, J. Nucl. Mater., vol. 392, pp. 164-170 (2009).

(56) References Cited

OTHER PUBLICATIONS

Kim, Y.S., et al., "Constituent redistribution in U—Pu—Zr Fuel During Irradiation," J. Nucl. Mater., vol. 327 (2004).
Klueh, "Mechanical properties of neutron-irradiated nickel-containing marensitic steels: II—Review and Analysis of Helium-Effects Studies," J. Nucl. Mater. vol. 357, p. 169 (2006).
Klueh, R.L. et al., "Tensile Behavior of Irradiated 12CR-1MoVW Steel," J. Nucl. Mater., vol. 137, p. 44 (1985).
Kohyama, A. et al., "Irradiation creep of low-activation ferritic steels in FFTF/MOTA," J. Nucl. Mater., vol. 212, pp. 751-754 (1994).
Landa, A. et al., "Density-functional study of the U—Zr system," Lawrence Livermore National Laboratory, Report No. LLNL-JRNL-405080 (2008).
Lewis, G., "Constitutive thermal creep deformation relations for lifetime prediction of a fusion reactor first wall ferritic alloy," Fusion Eng. Des., vol. 13, No. 4, pp. 407-415 (May 1991).
Maloy, S.A., et al., "Core materials development for the fuel cycle R&D Program," J. Nucl. Mater. vol. 415, p. 302 (2011).
Mansur, L.K et al., "Irradiation creep by climb-enabled glide of dislocations resulting from preferred absorption of point defects," Philos. Mag., vol. 39, pp. 497-506(1979).
Mansur, L.K., "Theory and experimental background on dimensional changes in irradiated alloys," J. Nucl. Mater., vol. 216, pp. 97-123 (1994).
Nam, C. et al., "Statistical Failure Analysis of Metallic U-10Zr/HT9 Fast Reactor Fuel Pin by Considering the Weibull Distribution and Cumulative Damage Fraction," Annals of Nuclear Energy, vol. 25, Issue 17, pp. 1441-1453 (1998).
Newton's Method http://en.wikipedia.org/wiki/Newton%27s_method.
Nuclear Systems Materials Handbook, vol. 2.
Ogata, T. et al., "Development and Validation of ALFUS: An Irradiation Behavior Analysis Code for Metallic Fast Reactor Fuels", Nuclear Technology, vol. 128, pp. 113-123, Oct. 1999.
Pahl, R.G. et al., "Experimental studies of U—Pu—Zr fast reactor fuel pins in EBR-II," Argonne National Laboratory, ANL Report No. CONF-8809202-2 (1988).
Pahl, R.G. et al., "Irradiation behavior of metallic fast reactor fuels," Argonne National Laboratory, ANL Report No. CP-73323 (1991).
Pahl, R.G. et al., "Irradiation experience with HT9 clad metallic fuel," Argonne National Laboratory, Report No. ANL-CP-72040 (1991).
Pahl, R.G. et al., "Performance of HT9 clad metallic fuel at high temperature," J. Nucl. Mater., vol. 204, pp. 141-147 (1993).
Ponte Castaneda, P., "The effective mechanical properties of nonlinear isotropic composites," J. Mech. Phys. Solids, vol. 39 (1991).
Porter, D.L. et al., "Direct evidence for stress-enhanced swelling in type 316 stainless steel," J. Nucl. Mater., vol. 116, pp. 272-276 (1983).
Puigh, R.J., "The In-reactor deformation of the PCA alloy," J. Nucl. Mater., vol. 141-143, pp. 954-959 (1986).
Redlich, O. et al., "On the thermodynamics of solutions V: an equation of state—fugacities of gaseous solutions," Chem. Rev., vol. 44 (1949).
Rough, F.A. et al., "Constitution of uranium and thorium alloys," Battelle Memorial Institute, Report No. BMI-1300 (1958).
Ryu, H.J. et al., "Review of HT-9 Cladding Creep Correlations for Advanced Liquid Metal Fast Reactors," Nucl. Fuels Struct. Mater., American Nuclear Society (2006).
Sahu, H.K. et al., "Void swelling and irradiation creep in stainless steel under compressive and tensile stress," J. Nucl. Mater., vol. 136, pp. 154-158 (1985).
Sandvik, thermal creep data, personal communication from R.L. Klueh (2011).
Sherby, O.D. et al., "Plastic flow and strength of uranium and its alloys," Lawrence Livermore National Laboratory, Report No. CONF-740205-6 (1974).
Shober, F.R. et al., "The physical and mechanical properties of alloy HT9 used in the design analysis of the core demonstration experiment," Report No. HEDL-TC-2845 (Aug. 1986).
Sofronis, P. et al., "Creep of power-law material containing spherical voids," J. Appl. Mech., vol. 59 (1992).
Taylor, G.I., Plastic Strain in Metals, J. Inst. Metals, vol. 62 (1938).
Toloczko, M.B. et al., "Variability of irradiation creep and swelling of HT9 irradiated to high neutron fluence at 400-600 degrees Celsius," Effects of Radiation on Materials: 18th International Symposium, ASTM STP 1325, pp. 765-779(1999).
Toloczko, M.B., "Irradiation creep of stainless steels," Thesis Dissertation, Washington State University (1999).
Toloczko, M.B., et al., "Comparison of thermal creep and irradiation creep of HT9 pressurized tubes and test temperatures from ~490 degrees Celsius to 605 degrees Celsius," Effects of Radiation on Materials: 20th International Symposium, ASTM STP 1405 (2002).
Toloczko, M.B., et al., "Irradiation creep and swelling of the US fusion heats of HT9 and 9Cr-1Mo to 208 dpa at—400C", J. Nucl. Mater., vol. 212-215, pp. 604-607, 1994.
Tsai, H. et al., "Irradiation performance of U—Pu—Zr metal fuels for liquid-metal-cooled reactors," 3rd International Conference on Nuclear Engineering, Paper No. ANL/ET/CP-82776, Kyoto, Japan (Apr. 23-27, 1995).
Wolfer, W.G., "Correlation of radiation creep theory with experimental evidence," J. Nucl. Mater., vol. 90, pp. 175-192 (1980).
Yacout, A.M. et al., "Average irradiation temperature for the analysis of the in-pile integral measurements," Nuclear Technology, vol. 115, p. 61 (1996).
Yacout, A.M. et al., "Degradation analysis estimates of the time-to-failure distribution of irradiated fuel elements," Nuclear Technology, vol. 113, p. 177 (1996).
Yokoo, T. et al., A Design Study on the FBR Metal Fuel and Core for Commercial Applications, J. Nucl. Sci. and Tech., vol. 37, No. 8, pp. 636-645 (2000).
Zegler, S.T. et al., Compatibility Between Metallic U—Pu-Base Fuels and Potential Cladding Materials, AIME, vol. 13, pp. 335-344 (Oct. 1967).
Zhang, D. et al., Diffusion reactions in the iron-neodymium binary alloy system, Phil. Mag. A., vol. 75, Issue 4, pp. 959-974 (1997).
Crawford et al., Fuels for sodium-cooled fast reactors: US Perspective. Journal of Nuclear Materials. 2007;371:202-31.
Sencer et al., Microstructural analysis of an HT9 fuel assembly duct irradiated in FFTF to 155 dpa at 443 ° C. Journal of Nuclear Materials. Sep. 2009;393:235-41.
Wolfer et al., The Interrelationship between Swelling and Irradiation Creep. Nuclear Technology. Oct. 1972;16:55-63.
Yacout, Long-life Metallic Fuel for the Super Safe, Small and Simple (4S) Reactor. Nuclear Engineering Division, Argonne National Laboratory, AFT-2008-000056, Rev. 000(0), Jun. 2008, 84 pages.
Extended European Search Report dated Jul. 28, 2017 in connection with European Application No. 15739820.7.
Karahan et al., Extended fuel swelling models and ultra high burn-up fuel behavior of U—Pu—Zr metallic fuel using Feast-Metal. Nuclear Engineering and Design. Feb. 28, 2013;258:26-34.
Marino et al., BACO (BArra COmbustible) code version 2.20: a thermo-mechanical description of a nuclear fuel rod. Journal of Nuclear Materials. Apr. 1, 1996;229:155-68.

* cited by examiner

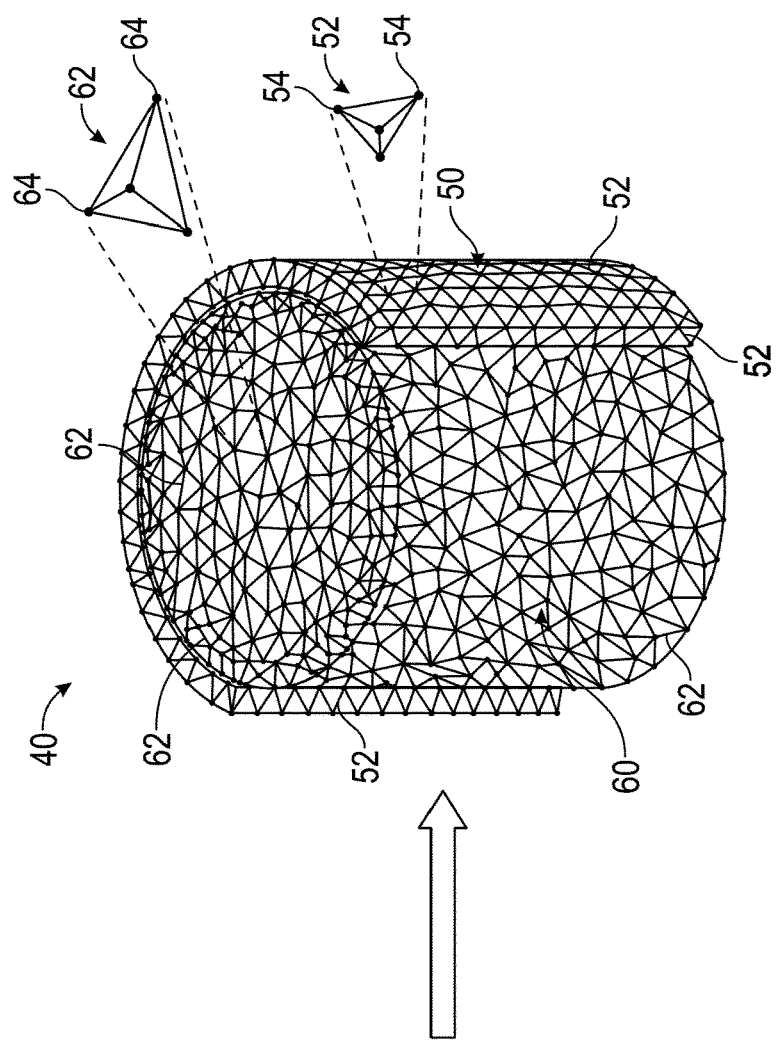
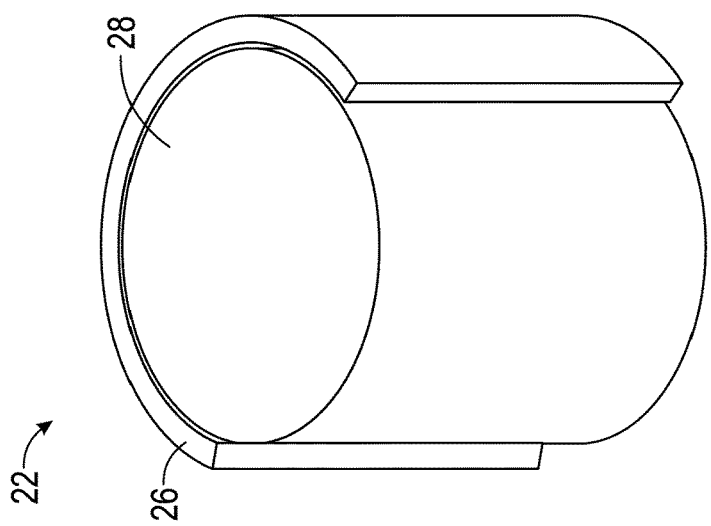
FIG. 7B
FIG. 7A

MODELING FOR FUEL ELEMENT DEFORMATION

CROSS-REFERENCE TO RELATED PATENT APPLICATIONS

This application claims the benefit of and priority to U.S. Provisional Application No. 61/932,245, filed Jan. 27, 2014, which is incorporated herein by reference in its entirety.

BACKGROUND

Breed-and-burn reactors utilize a high burn-up fuel cycle in order to reach equilibrium. During the high burn-up cycle, fuel elements of the traveling wave reactors experience high irradiation doses. The irradiation can cause irradiation creep and swelling, resulting in distortion and dimensional changes of the fuel elements. Distortion beyond design limits may result in the prevention of fuel shuffling. Additionally, thermal creep may be design limiting for fuel elements operating a high temperatures for extended periods.

SUMMARY

Disclosed embodiments include a computerized system and a computerized method for modeling reactor fuel pin and fuel design to determine the thermo-mechanical performance thereof.

According to one embodiment, a computerized system for modeling reactor fuel element and fuel design to determine the thermo-mechanical performance thereof includes a processor coupled to memory, the memory configuring the processor to execute a fuel element performance analysis and an output configured to communicate data that describes the thermo-mechanical performance of the fuel element and fuel design based on the fuel element performance analysis. The processor configured to estimate the mechanical behavior of a fuel with open porosity and closed porosity components by (a) creating separate variables for the open porosity and the closed porosity components of the fuel, (b) conducting a routine for both the open porosity and the closed porosity components that processes the current state of the fuel and updates the current state and forces of each of the open porosity and the closed porosity components of the fuel, and (c) combining the updates for the current state and forces of the fuel from the processing of the open porosity and the closed porosity components according to a weighting; and estimate the creep and swelling behavior of a cladding. The estimated parameters are utilized in the fuel element performance analysis.

According to another embodiment, a computerized system for modeling reactor fuel element and fuel design to determine the thermo-mechanical performance thereof includes a processor coupled to memory, the memory configuring the processor to execute a fuel element performance analysis, and an output configured to communicate data that describes the thermo-mechanical performance of the fuel element and fuel design based on the fuel element performance analysis. The processor is configured to estimate the mechanical behavior of a fuel with open porosity by (a) creating a variable for the open porosity component of the fuel, (b) conducting a routine for the open porosity component that processes the current state of the fuel and updates the current state and forces of the open porosity component of the fuel, and (c) combining the updates for the current state and forces of the fuel from the processing of the open porosity component according to a weighting; and estimate the creep and swelling behavior of a cladding. The estimated parameters are utilized in the fuel element performance analysis.

According to another embodiment, a computerized system for modeling reactor fuel element and fuel design to determine the thermo-mechanical performance thereof includes a processor coupled to memory, the memory configuring the processor to execute a fuel element performance analysis, and an output configured to communicate data that describes the thermo-mechanical performance of the fuel element and fuel design based on the fuel element performance analysis. The processor is configured to estimate the mechanical behavior of a fuel with closed porosity by (a) creating a variable for the closed porosity component of the fuel, (b) conducting a routine for the closed porosity component that processes the current state of the fuel and updates the current state and forces of the closed porosity component of the fuel, and (c) combining the updates for the current state and forces of the fuel from the processing of the closed porosity component according to a weighting; and estimate the creep and swelling behavior of a cladding. The estimated parameters are utilized in the fuel element performance analysis.

According to another embodiment, a computerized method for modeling reactor fuel element and fuel design to determine the thermo-mechanical performance thereof includes estimating (a) the mechanical behavior of a fuel, and (b) the creep and swelling behavior of a cladding; passing the estimated parameters to a fuel element performance analysis for modeling the reactor fuel element and fuel design; and communicating data that describes the thermo-mechanical performance of the fuel element and fuel design based on the fuel element performance analysis.

The foregoing is a summary and thus may contain simplifications, generalizations, inclusions, and/or omissions of detail; consequently, those skilled in the art will appreciate that the summary is illustrative only and is NOT intended to be in any way limiting. In addition to any illustrative aspects, embodiments, and features described above, further aspects, embodiments, and features will become apparent by reference to the drawings and the following detailed description. Other aspects, features, and advantages of the devices and/or processes and/or other subject matter described herein will become apparent in the teachings set forth herein.

BRIEF DESCRIPTION OF THE DRAWINGS

FIGS. 7A-7B are partial-cutaway perspective views of a fuel element and a meshed fuel element, according to one embodiment;

DETAILED DESCRIPTION

Introduction

Figure 1:
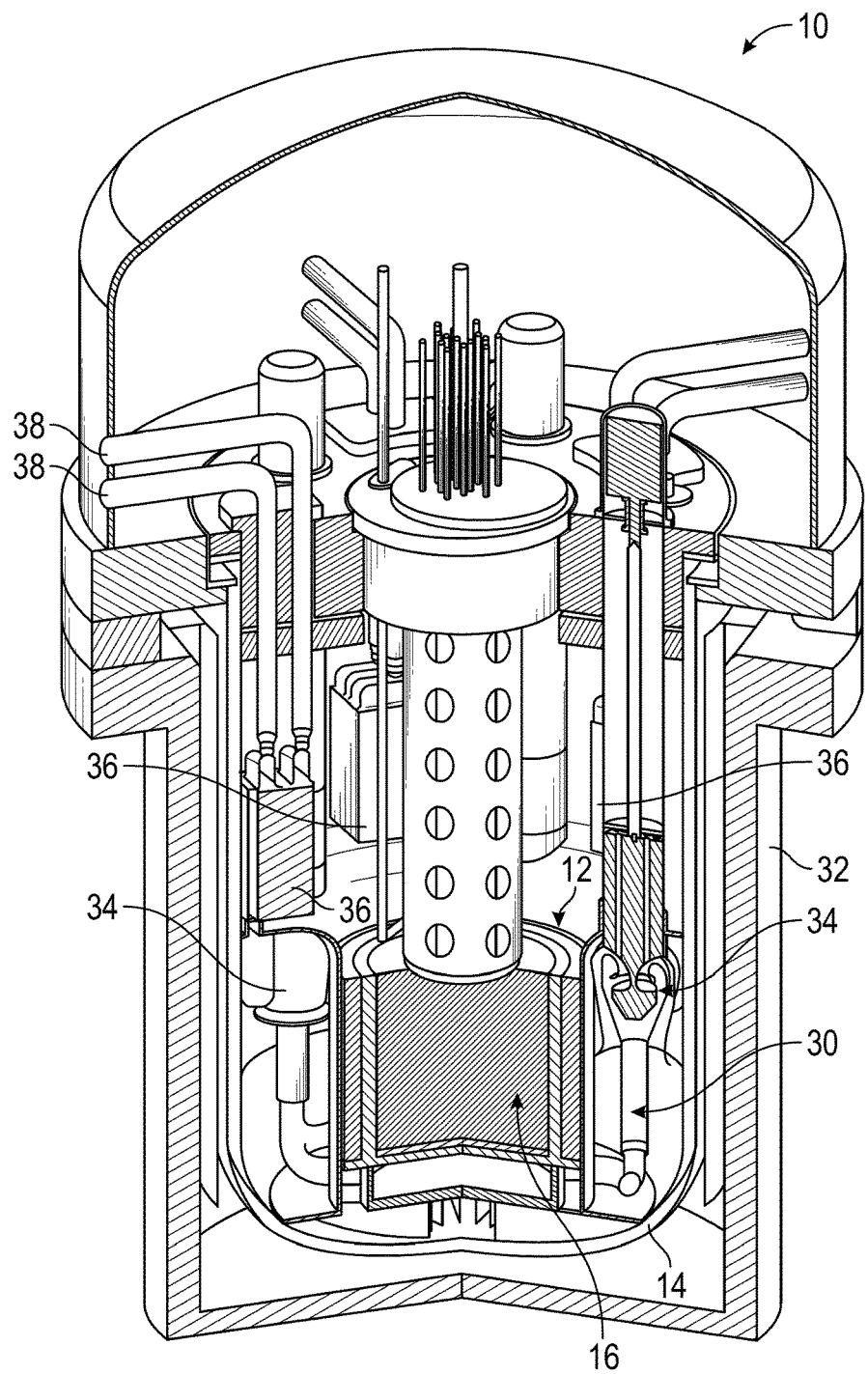
FIG. 1 is a partial-cutaway perspective view of a nuclear fission reactor, according to one embodiment.

In the following detailed description, reference is made to the accompanying drawings, which form a part hereof. In the drawings, the use of similar or the same symbols in different drawings typically indicates similar or identical items, unless context dictates otherwise.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Overview

Given by way of overview, illustrative embodiments include systems for modeling reactor fuel pin and fuel design to determine the thermo-mechanical performance thereof; and methods for modeling reactor fuel pin and fuel design to determine the thermo-mechanical performance thereof.

The computer system estimates solutions the behavior of a fuel element within a nuclear reactor to determine the thermo-mechanical performance for use in setting or analyzing design values and design requirements. In one embodiment, a finite element method is used to determine the behavior of fuel and cladding of a fuel element. A first subroutine models the mechanical behavior of the fuel, and a second subroutine models the creep and swelling behavior of the cladding.

Applicants have identified new systems and methods of accurately determining the thermo-mechanical performance of a fuel element. The systems and methods account for: (i) the internal pressurization from the production and temperature of fission gas; (ii) open and closed porosity of the fuel; and (iii) the mechanical behavior of the cladding surrounding the fuel. Models have been created for use in conducting each of these fuel element modeling processes. The models are received by a computerized system for analysis such that a more accurate approximation of the performance of the fuel element is determined.

Nuclear Fission Reactor

Figure 2:
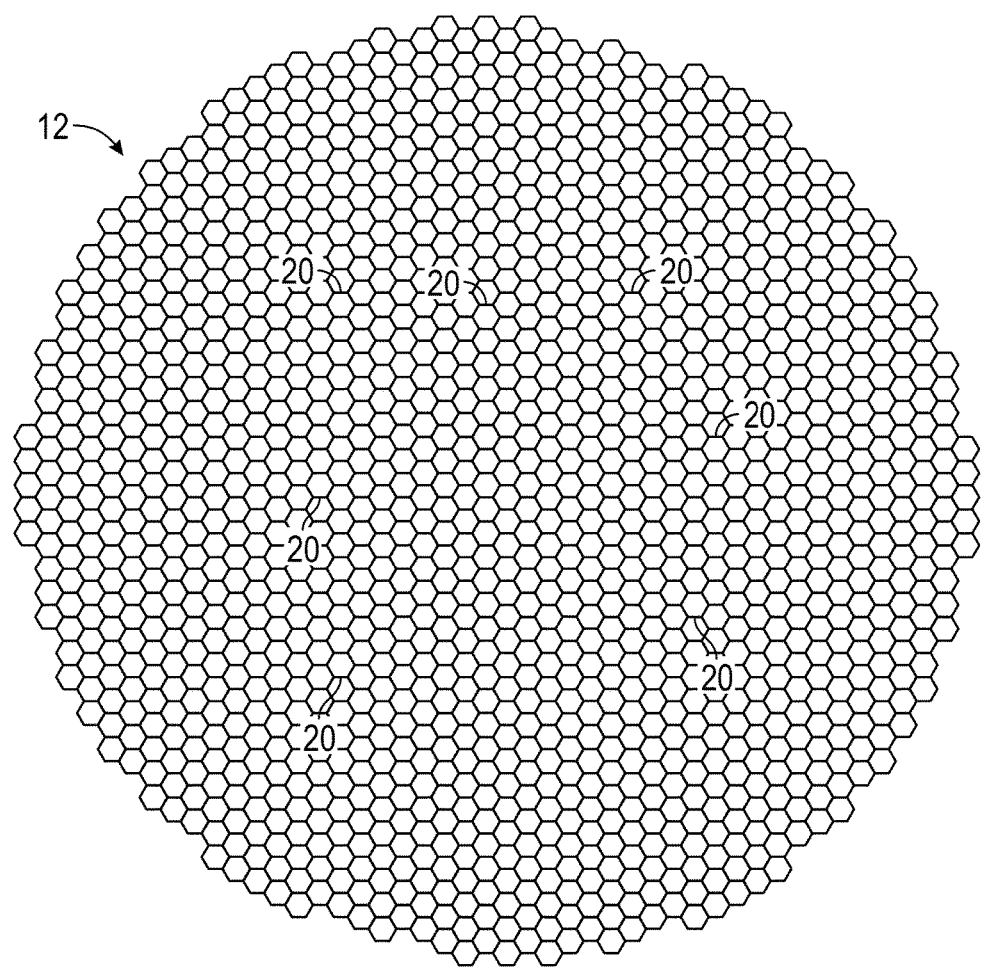
FIG. 2 is a top sectional view of a reactor core for a nuclear fission reactor, according to one embodiment.

Referring to FIGS. 1-2 and given by way of non-limiting overview, an illustrative nuclear reactor, shown as nuclear fission reactor 10, will be described by way of illustration and not of limitation. In one embodiment, the nuclear fission reactor 10 is a Traveling Wave Reactor (TWR). A TWR is a type of breed-and-burn and/or breed-and-burn equilibrium nuclear reactor that does not require an ongoing supply of fuel, and in which waves that breed and then burn may travel relative to the fuel. TWR includes, without limitation, standing wave reactors. In other embodiments, the nuclear fission reactor 10 is another type of reactor, or other device having fuel and cladding which experience stresses and have open and/or closed porosity components of fuel, including without limitation light water reactors, heavy water reactors, graphite modulated reactors, fast breeder reactors, liquid metal fast breeder reactors, etc.

As shown in FIG. 1, the nuclear fission reactor 10 includes a nuclear fission reactor core 12 disposed in a reactor vessel 14. According to one embodiment, the nuclear fission reactor core 12 includes a plurality of nuclear fuel assemblies, each having a duct, configured to contain nuclear fuel within a fuel region 16. The plurality of nuclear fuel assemblies may be disposed within the reactor vessel 14. As shown in FIG. 2, the nuclear fission reactor core 12 includes nuclear fuel assemblies 20. In one embodiment, the nuclear fuel assemblies 20 of the nuclear fission reactor core 12 include fissile nuclear fuel assemblies (i.e., a set of starter fuel assemblies, etc.). Additionally or alternatively, the nuclear fuel assemblies 20 include fertile nuclear fuel assemblies (i.e., a set of feed fuel assemblies, etc.). Fissile nuclear fuel assemblies may include U-235 to start the fission reaction. Fertile nuclear fuel assemblies may include U-238. According to one embodiment, a nuclear fission reactor 10 includes an in-vessel handling system. The in-vessel handling system may be configured to shuffle ones of fissile nuclear fuel assemblies and ones of fertile nuclear fuel assemblies. As shown in FIG. 1, the nuclear fission reactor 10 also includes a reactor coolant system 30.

Still referring to FIG. 1, embodiments of the nuclear fission reactor 10 may be sized for any application as desired. For example, various embodiments of the nuclear fission reactor 10 may be used in low power (less than 50 $MW_e$, around 300 $MW_e$-around 500 $MW_e$) applications, medium power (around 500 $MW_e$-around 1000 $MW_e$) applications, and large power (around 1000 $MW_e$ and above) applications as desired.

Embodiments of the nuclear fission reactor 10 are based on elements of liquid metal-cooled, fast reactor technology (e.g., a sodium-cooled fast reactor design that utilizes a high burn-up metallic uranium fuel cycle, etc.) without the water-induced neutron impedance traditionally associated with light water reactors (LWRs). In various embodiments, the reactor coolant system 30 includes a pool of liquid sodium disposed in the reactor vessel 14. In such cases, the nuclear fission reactor core 12 is submerged in the pool of sodium coolant in the reactor vessel 14. The reactor vessel 14 is surrounded by a containment vessel 32 that helps prevent loss of sodium coolant in the unlikely case of a leak from the reactor vessel 14.

In various embodiments, the reactor coolant system 30 includes a reactor coolant pump, shown as pump 34. As shown in FIG. 1, reactor coolant system 30 includes two pumps 34. Pumps 34 may be any suitable pump as desired (e.g., an electromechanical pump, an electromagnetic pump, etc.). The reactor coolant system 30 also includes heat exchangers 36. Heat exchangers 36 are disposed in the pool of liquid sodium. Heat exchangers 36 have non-radioactive intermediate sodium coolant on the other side of heat exchangers 36, according to one embodiment. To that end, heat exchangers 36 may be considered intermediate heat exchangers. According to one embodiment, steam generators are in thermal communication with the heat exchangers 36. It will be appreciated that any number of pumps 34, heat exchangers 36, and steam generators may be used as desired.

The pumps 34 circulate primary sodium coolant through the nuclear fission reactor core 12. The pumped primary sodium coolant exits the nuclear fission reactor core 12 at a top of the nuclear fission reactor core 12 and passes through one side of the heat exchangers 36. According to one embodiment, heated intermediate sodium coolant is circulated via intermediate sodium loops 38 to the steam generators. The steam generators may generate steam to drive turbines and electrical generators. According to other embodiments, heated intermediate sodium coolant is circulated to heat exchangers for still another use.

The operation and construction of nuclear reactors is described by way of example and not of limitation in U.S. patent application Ser. No. 12/930,176, entitled Standing Wave Nuclear Fission Reactor and Methods, naming Charles E. Ahlfeld, Thomas M. Burke, Tyler S. Ellis, John Rogers Gilleland, Jonatan Hejzlar, Pavel Hejzlar, Roderick A. Hyde, David G. McAlees, Jon D. McWhirter, Ashok Odedra, Robert C. Petroski, Nicholas W. Touran, Joshua C. Walter, Kevan D. Weaver, Thomas Allan Weaver, Charles Whitmer, Lowell L. Wood, Jr., and George B. Zimmerman as inventors, filed Dec. 30, 2010, the content of which is hereby incorporated by reference in its entirety.

Nuclear Fuel Assembly

Figures 3A, 3B:
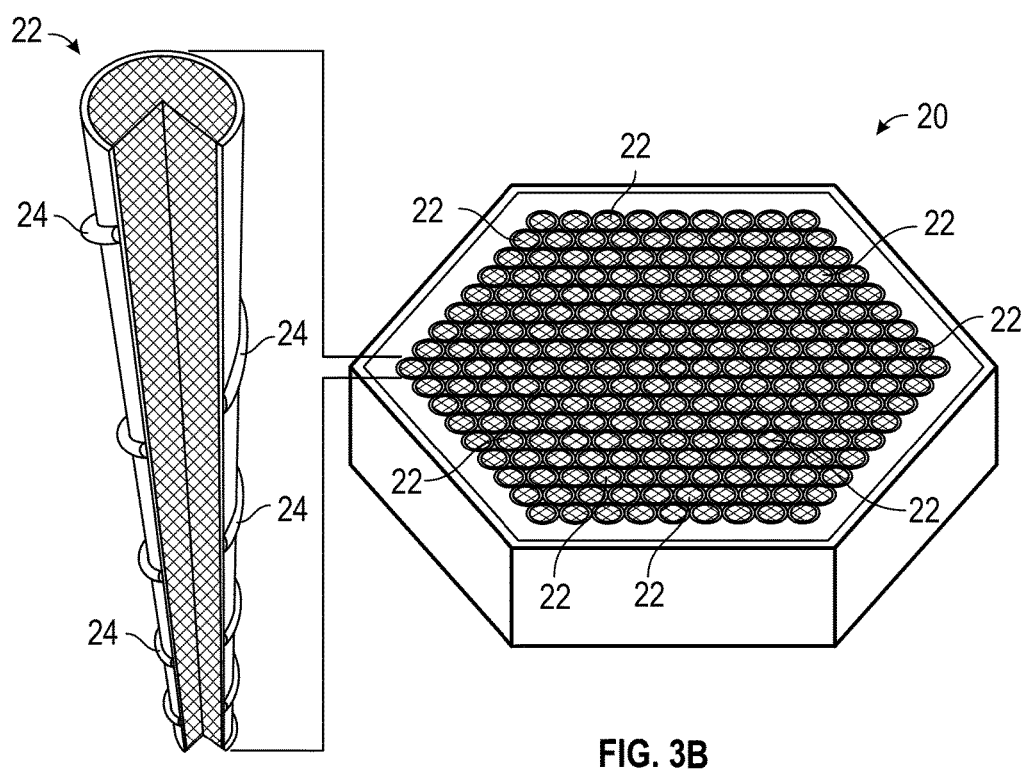
FIGS. 3A-3B are partial-cutaway perspective views of a fuel element and a nuclear fuel assembly, according to one embodiment.
Figure 4:
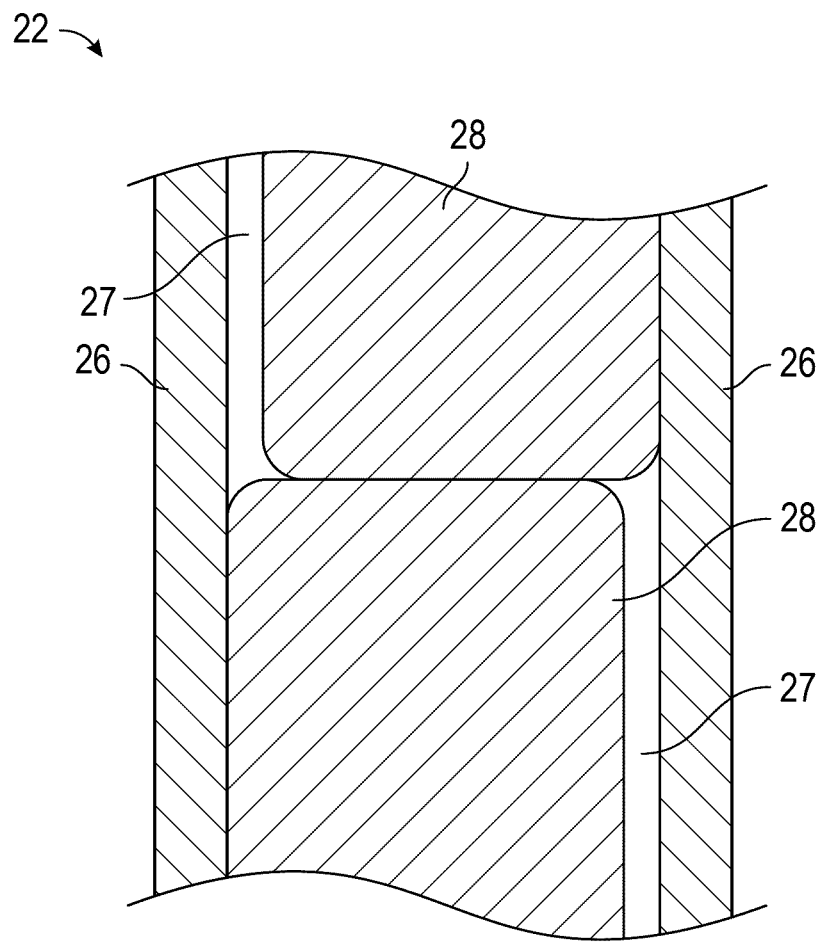
FIG. 4 is a cross-sectional view of a fuel element, according to one embodiment.

FIG. 3B provides a partial illustration of a nuclear fuel assembly 20 in accordance with one embodiment. The nuclear fuel assembly 20 may include a fissile nuclear fuel and/or a fertile nuclear fuel. As shown in FIG. 3B, the nuclear fuel assembly 20 includes fuel elements (e.g., fuel components, fuel rods, fuel pins, etc.), shown as fuel elements 22. As shown in FIG. 4, the fuel element 22 includes a cladding, shown as cladding layer 26. Additionally or alternatively, the fuel element 22 may include another type of cladding. The fuel element 22 further includes a fuel (e.g., fuel slug, fuel pellet, etc.), shown as fuel slug 28. The fuel slug 28 may be sealed within a cavity defined by the cladding layer 26. In some embodiments, multiple fuel slugs 28 are stacked axially as shown in FIG. 4, but this need not be the case. In other embodiments, the fuel element 22 includes a fuel slug 28 that is structured as one continuous body of fuel material.

In some embodiments, as shown in FIG. 4, the fuel elements 22 include at least one gap 27. In one embodiment, the one or more gaps 27 are present between the fuel slugs 28 and the cladding layer 26. In another embodiment, the gap(s) 27 are not present. In one embodiment, the gap 27 is at least partially filled with a pressurized atmosphere. By way of example, the pressurized atmosphere may include a helium atmosphere. In other embodiments, the gap 27 is at least partially filled with a coolant, such as liquid sodium. Additionally or alternatively, the fuel element 22 includes a liner disposed between the fuel slugs 28 and the cladding layer 26. In some embodiments, the liner includes multiple layers.

The fuel slugs 28 may contain any fissionable material. A fissionable material may include a metal and/or a metal alloy. In one embodiment, the fuel is a metal fuel. Metal fuel may offer relatively high heavy metal loadings and excellent neutron economy, which is desirable for the breed-and-burn process of a nuclear fission reactor. Depending on the application, the fuel slugs 28 may include at least one element selected from the group of elements including Uranium (U), Thorium (Th), Americium (Am), Neptunium (Np), and Plutonium (Pu). In one embodiment, the fuel slugs 28 may include at least about 90% by weight (wt %) U (e.g., at least 89 wt %, 95 wt %, 98 wt %, 99 wt %, 99.5 wt %, 99.9 wt %, 99.99 wt %, or higher of U, etc.). Additionally or alternatively, the fuel slugs 28 may include a refractory material. The refractory material may include at least one element chosen from a group of elements including Niobium (Nb), Molybdenum (Mo), Tantalum (Ta), Tungsten (W), Rhenium (Re), Zirconium (Zr), Vanadium (V), Titanium (Ti), Chromium (Cr), Ruthenium (Ru), Rhodium (Rh), Osmium (Os), Iridium (Ir), and Hafnium (Hf). Additionally or alternatively, the fuel slugs 28 include burnable poisons. Burnable poisons include boron, gadolinium, and indium, among other materials.

In one embodiment, the fuel slug 28 includes a metal fuel alloyed with Zirconium. By way of example, the metal fuel may include about 3 wt % to about 10 wt % of Zirconium. Zirconium may dimensionally stabilize the alloyed metal during irradiation and inhibit low-temperature eutectic and corrosion damage of the cladding layer 26. In one embodiment, a sodium thermal bond fills the gap 27 that exists between the alloyed fuel slugs 28 and the inner wall of the cladding layer 26. The sodium thermal bond may allow for fuel swelling and provide efficient heat transfer, which may advantageously reduce fuel temperatures. In one embodiment, the fuel elements 22 include a thin wire, show as wire 24, helically wrapped around the circumference of the cladding layer 26. By way of example, the wire 24 may have a diameter from about 0.8 mm to about 1.6 mm. The wire 24 may provide coolant space and mechanical separation between the fuel elements 22 within the housing of the nuclear fuel assembly 20. In one embodiment, the cladding layer 26 and/or the wire 24 are fabricated from ferritic-martensitic steel because of its irradiation performance.

Fuel Element

As shown in FIGS. 3A-4, a fuel element, such as the fuel element 22, used in a fuel assembly of a power generating reactor may generally take the form of a cylindrical rod. Additionally or alternatively, the fuel element 22 takes the form of another shape. The fuel element 22 may be a part of a power generating reactor, such as the nuclear fission reactor 10 shown in FIG. 1, which is a part of a nuclear power plant. Depending on the application, the fuel element 22 may have any suitable dimensions with respect to its length, width, diameter, etc.

The fuel slugs 28 may have any geometry. In one embodiment, the fuel slugs 28 have an annular shape. In such an embodiment, the fuel slugs 28 in an annular form may allow a desirable level of fuel density to be achieved after a certain level of burn-up. Additionally or alternatively, such an annular configuration may maintain compressive forces between the fuel slugs 28 and the cladding layer 26 to promote thermal transport. In one embodiment, the fuel slugs 28 of the fuel element 22 include a nuclear fuel. In some embodiments, the nuclear fuel has an annular shape. The fuel slugs 28 may be tailored to have various properties (e.g., characteristics, density, porosity, etc.) depending on the application. For example, the fuel slugs 28 may have any level of density or porosity. In one embodiment, the fuel slugs 28 have a large density, such as a density substantially close to the theoretical density of Uranium (in the non-limiting example whereby the fuel slugs 28 contain Uranium). In another embodiment, the fuel slugs 28 have a relatively lower density. A fuel with a low density (i.e., a high porosity, etc.) may have and/or promote formation of independent and/or interconnected (open and/or closed) voids during irradiation, decreasing fuel pressure on the structural material, such as the cladding layer 26, during operation with the nuclear fuel. Operation of with the fuel forms fission products, therefore any mention of fuel herein includes fission products.

The cladding material for the cladding layer 26 may be or include any suitable material, depending on the application. In one embodiment, the cladding layer 26 includes at least one material selected from a group including a metal, a metal alloy, and a ceramic. Additionally or alternatively, the cladding layer 26 includes a refractory material. The refractory material may include at least one refractory metal selected from the group including Nb, Mo, Ta, W, Re, Zr, V, Ti, Cr, Ru, Rh, Os, Ir, Nd, and Hf. In another embodiment, the cladding material includes a ceramic material. Ceramic materials include silicon carbide and aluminum oxide (alumina), among other materials.

A metal alloy in cladding layer 26 may be, in one example embodiment, steel. The steel may be selected from a group including an austenitic steel, a ferritic-martensitic steel, an oxide-dispersed steel, T91 steel, T92 steel, HT9 steel, 316 steel, and 304 steel. The steel may have any type of microstructure. For example, the steel may include one or more regions of a martensite phase, a ferrite phase, and/or an austenite phase. In one embodiment, substantially all of the steel has at least one phase selected from a group including a martensite phase, a ferrite phase, and an austenite phase. Depending on the application, the microstructure may be tailored to have one or more particular phases. In other embodiments, the cladding layer 26 contains an iron-based composition.

Behavior of a Fuel Element

Fuel element performance modeling of the fuel element 22 considers the complex behaviors of various components. The complex behaviors may include, but are not limited to, the mechanical response of materials, such as the fuel slugs 28, under irradiation, the large temperature gradients that exist within the fuel element 22, the accumulation and transport of solid and gaseous fission products from the fuel slugs 28, the diffusion of fission products into the cladding layer 26, and the creep and swelling of the cladding layer 26, among others.

By way of example, the behavior of the fuel element 22 (e.g., during a power cycle, over the life of the fuel element, etc.) with a smear density of about 75% and with low-swelling HT9 cladding may be summarized as follows: (i) metallic fuel slugs 28 may become porous or may become more porous due to the nucleation of fission gas bubbles and a tearing mechanism that is associated with anisotropic growth of individual grains in the fuel slugs 28; (ii) at a burn-up of 1-2 atom percent, the porous fuel slugs 28 may contact the cladding layer 26; (iii) up to a burn-up of 8-10 atom percent, swelling of the fuel element 22 may remain minimal, which necessarily implies that the porosity of the fuel slugs 28 is being reduced by the accumulation of solid fission products; and (iv) past 10 atom percent burn-up, the fuel element 22 begins to swell as fission gas pressure increases to a threshold where the cladding layer 26 begins to deform due to irradiation creep.

One of the most significant constraints in the fuel and fuel assembly development is the performance of the cladding layer 26 and duct material of the nuclear fuel assemblies 20. Irradiation creep and swelling may result in distortion and/or dimensional changes of the cladding layer 26. Distortion and/or dimensional changes to the cladding layer 26 may close or restrict coolant channels, resulting in local temperature increase. Distortion beyond design limits may prevent fuel shuffling within the nuclear fuel assemblies 20 (e.g., a stuck fuel assembly, etc.). In addition, thermal creep caused by local temperature increases may be design limiting for fuel elements 22 which operate at high temperatures for long lifetimes.

According to an example embodiment, a finite element system is utilized to determine (e.g., estimate, predict, monitor, etc.) the thermo-mechanical performance of the fuel element 22. In one embodiment, the finite element system determines the mechanical behavior of the fuel slugs 28. Additionally or alternatively, the finite element system determines the creep and swelling behavior of the cladding layer 26.

In one embodiment, subroutines (e.g., models, etc.) of the fuel slugs 28 and/or the cladding layer 26 are integrated within and/or provide supplementary support to the finite element system. The models may aid in the predictive capability of the finite element system to determine the mechanical behavior of the fuel slugs 28 and/or the creep and swelling behavior of the cladding layer 26. Additionally or alternatively, the models may aid in identifying key trends in the behavior of the fuel element 22. The results from the finite element system (e.g., deformation behavior, fuel element performance data, etc.) may be used in setting or analyzing design values and design requirements to provide insight on the performance of the fuel elements 22.

Fuel Modeling

The fuel performance model accounts for the behavior of the fuel slugs 28. Models that describe the mechanical response of fuel slugs 28 may be complicated by the fact that the fuel slugs 28 becomes porous as fission gas bubbles are nucleated, solid fission products continually add solid volume to the fuel slugs 28 as well as alter the composition of the fuel slugs 28, eventually a fraction of the porosity links together and becomes connected to the plenum, and fuel constituents become redistributed over time. Understanding the detailed behavior of any of these phenomena from a completely fundamental perspective is not only difficult, but may result in a model of such complexity that the very basic behaviors of the fuel element 22 are obscured. In addition, fundamental models often have a great number of undetermined coefficients.

A model for the deformation of the fuel slugs 28 may include the following elements: (i) expressions for fission gas behavior and the accumulation of fission products; (ii) observations and modeling of fission gas release; (iii) expressions that describe the creep behavior of internally pressurized porous solids under the action of external loads; (iv) a model for the fuel slugs 28 with closed porosity; (v) a model for the fuel slugs 28 with open porosity; (vi) a model that estimates the combined effect of fuel slugs 28 with closed and open porosity; and (vii) a model for the transport of thermal energy from the fuel slugs 28 to a coolant (e.g., liquid metal, water, etc.).

The basic mechanism that drives the deformation of the fuel elements 22 (at least for elements that use low-swelling cladding material) is the accumulation of fission products within the fuel slugs 28. In one embodiment, the fuel element 22 includes a Uranium alloy fuel slug 28 with a ferritic-martensitic steel (e.g., HT9, etc.) cladding layer 26. Fission product atoms, precipitates, and phases that form occupy more volume than Uranium atoms they replace (in the non-limiting example of the fuel slug 28 including Uranium). This may result in the fuel slugs 28 and fission products applying pressure to the cladding layer 26. Gas release may be used in the selection of fuel smear density and plenum size (e.g., or used in a decision whether to vent the fuel element 22, etc.) and may substantially influence predictions for the lifetime of the fuel element 22.

The mechanical behavior of the fuel slugs 28 may be represented by a constitutive model where the components of a total rate-of-deformation tensor include the sum of elastic, thermal expansion, and inelastic deformation rates:

$$\dot{\varepsilon}_f^{total} = \dot{\varepsilon}_f^{elastic} + \dot{\varepsilon}_f^{inelastic} + \dot{\varepsilon}_f^{th\ exp} \qquad (1)$$

where
$\dot{\varepsilon}_f^{total}$ is the total strain rate for the fuel
$\dot{\varepsilon}_f^{elastic}$ is the elastic strain rate for the fuel
$\dot{\varepsilon}_f^{inelastic}$ is the inelastic strain rate for the fuel
$\dot{\varepsilon}_f^{th\ exp}$ is the thermal expansion strain rate for the fuel, which may include any combination of a plastic component and/or a creep strain rate, etc.

The rate of stress (e.g., Jaumann rate of Cauchy or true stress, etc.) may be related to the elastic rate-of-deformation tensor through a stiffness tensor:

$$\dot{\sigma}_f = C_f \dot{\varepsilon}_f^{elastic} = C_f(\dot{\varepsilon}_f^{total} - \dot{\varepsilon}_f^{inelastic} - \dot{\varepsilon}_f^{th\ exp}) \qquad (2)$$

where $\dot{\sigma}_f$ is the stress rate for the fuel slugs 28 and $C_f$ represents the elastic stiffness tensor (or tangent stiffness matrix) for the fuel slugs 28.

The model for the fuel slugs 28 may include both the modeling of external loading (e.g., from the cladding layer 26 of the fuel element 22, etc.) and from internal loading (e.g., from the pressure due to fission gas, etc.). The following expression may be used to account for the fission gas pressure and its inelastic effect on the fuel slugs 28.

$$\dot{\varepsilon}_f^{inelastic} = \dot{\varepsilon}_o \left(\frac{\sigma_{eff}}{\sigma_o}\right)^n \left\{ a(n, v_f) \frac{3S}{2\sigma_{eff}} + b(n, v_f) \frac{(\sigma_H + P)\delta}{3\sigma_{eff}} \right\} \qquad (3)$$

where $\dot{\varepsilon}_o$ is the reference creep rate, $\sigma_o$ is the reference stress, $\sigma_{eff}$ is the effective stress, n is a material parameter, such as a stress exponent, $v_f$ is the volume fraction of pores within the solid (e.g., the fuel, etc.), S is the stress deviator, $\sigma_H$ is the hydrostatic stress, P is the fission gas pressure, $\delta$ is the Kronecker delta, and a and b are functions of $v_f$ and n.

A model of fuel behavior may estimate the fission gas pressure as a function of pore volume fraction, fission density (or equivalently, burn-up), and temperature. For closed porosity, the fission gas within a given pore comes directly from the fuel surrounding the pore. Thus, local pore volume fraction, fission density, and temperature may be used to determine the fission gas pressure in a region of closed porosity. In contrast, the fission gas pressure in the open porosity and the plenum are non-local in nature (i.e., the fission gas pressure depends on how fission density, deformation, and temperature evolve throughout the entire fuel element 22, etc.). In one embodiment, a new class of finite elements, referred to as continuum elements herein, is used to simulate the transport of fission gas through regions of open porosity, estimate the resulting fission gas pressure, and apply the fission gas pressure over the entire fuel element 22. In an alternate embodiment, the open porosity volume is approximated using the initial volume and an average burn-up to estimate the open porosity of the fuel slugs 28.

The behavior of the fuel slugs 28 that have both open and closed porosity may be homogenized. The evolution of stress in the regions of open and closed porosity may be written as a weighted average of the stresses in the fuel with open and/or closed porosity:

$$\dot{\sigma}_f = \Gamma \dot{\sigma}_f^{open} + (1-\Gamma)\dot{\sigma}_f^{closed} \qquad (4)$$

where $\dot{\sigma}_f^{open}$ is the stress rate in the regions of open porosity, $\dot{\sigma}_f^{closed}$ is the stress rate in the regions of closed porosity, and $\Gamma$ is the gas release fraction. Equation (2) may be modified to account for both the open and the closed porosity of the fuel slugs 28. It is to be appreciated that any valuation of the stress rate considering either or both open and closed porosity may be used including, without limitation, Jacobian matrix, etc.

Completing the fuel model includes specifying the thermo-elastic behavior of the fuel slugs 28. Strain rates associated with the thermal expansion of the fuel slugs 28 may be defined by $$\dot{\varepsilon}_f^{th\ exp} = \alpha_f \dot{T}_f \delta \qquad (5)$$

where $\alpha_f$ is the thermal expansion coefficient of the fuel slugs 28 and $\dot{T}_f$ is the rate of change in the temperature of the fuel slugs 28, and $\delta$ is the Kronecker delta.

Cladding Modeling

Another challenge in developing models for the deformation of the fuel element 22 is to specify a set of relations that describe the behavior of the cladding layer 26 and the nuclear fuel assembly 20. The nuclear fuel assembly 20 depends on a cladding material with demonstrated swelling resistance to high doses (e.g., of displacements per atom (dpa), etc.), as well as adequate thermal creep strength. According to an example, HT9 steel is used as the cladding material for the cladding layer 26, as HT9 steel demonstrates excellent swelling and strain performance. In other embodiments, any of the aforementioned cladding materials may be used for the cladding layer.

HT9 steel is a 12Cr-1Mo—W—V ferritic-martensitic steel which is supplanted by other more advanced steel alloys for use in fossil-fuel power plants. HT9 steel is used with sodium-cooled fast reactors because of a substantial irradiation performance database on the mechanical properties of HT9 steel, as well as because of HT9 steel's resistance to irradiation-induced swelling. Developing a model for the cladding layer 26 requires assembling and collating data on a variety of deformation mechanisms for HT9 steel and fitting that data with a physically consistent mathematical model. The constitutive model includes parameters such as thermal, irradiation, and viscoplastic creep, as well as stress-free and stress-enhanced swelling.

The total strain rate of the cladding layer 26 (e.g., HT9 cladding material, etc.) is the sum of the contributing strain rates associated with different deformation mechanisms. The complete constitutive model for the cladding layer 26 may be represented as $$\dot{\varepsilon}_c^{total} = \dot{\varepsilon}_c^{elastic} + \dot{\varepsilon}_c^{vp} + \dot{\varepsilon}_c^{th} + \dot{\varepsilon}_c^{ir} + \dot{\varepsilon}_c^{swell} + \dot{\varepsilon}_c^{se} + \dot{\varepsilon}_c^{th\ exp} \qquad (6)$$

where
$\dot{\varepsilon}_c^{total}$ is the total strain rate for the cladding
$\dot{\varepsilon}_c^{elastic}$ is the elastic strain rate for the cladding
$\dot{\varepsilon}_c^{vp}$ is the viscoplastic strain rate for the cladding
$\dot{\varepsilon}_c^{th}$ is the thermal creep strain rate for the cladding
$\dot{\varepsilon}_c^{ir}$ is the irradiation creep strain rate for the cladding
$\dot{\varepsilon}_c^{se}$ is the stress-enhanced swelling strain rate for the cladding
$\dot{\varepsilon}_{swell}$ is the stress-free swelling strain rate for the cladding
$\dot{\varepsilon}_c^{th\ exp}$ is the thermal expansion strain rate for the cladding The stress rate and the elastic strain rate are linearly related through the elastic stiffness matrix such that $$\dot{\sigma}_c = C_c \dot{\varepsilon}_c^{elastic} \quad (7)$$

which may be rewritten as $$\dot{\sigma}_c = C_c(\dot{\varepsilon}_c^{total} - \dot{\varepsilon}_c^{vp} - \dot{\varepsilon}_c^{th} - \dot{\varepsilon}_c^{ir} - \dot{\varepsilon}_c^{swell} - \dot{\varepsilon}_c^{se} - \dot{\varepsilon}_c^{th\,exp}) \quad (8)$$

where $\dot{\sigma}_c$ is the stress rate for the cladding layer 26 and $C_c$ is the elastic stiffness tensor (stiffness matrix) for the cladding layer 26.

Strain rates associated with the thermal expansion of the cladding layer 26 may be defined by $$\dot{\varepsilon}_c^{th\,exp} = \alpha_c(T) \dot{T}_c \delta \quad (9)$$

where $\alpha_c(T)$ is the thermal expansion coefficient of the cladding layer 26, $\dot{T}_c$ is the rate of change in the temperature of the cladding layer 26, and $\delta$ is the Kronecker delta. The thermal expansion coefficient of a material is related to the atomic bond strength and crystal structure. Since the bond strength and crystal structure of the cladding layer 26 are typically unaffected by the irradiation (e.g., if the elemental transmutation is low, etc.), the expansion coefficient is expected to be unaffected by irradiation.

The steady state creep rates for thermal, irradiation, and viscoplastic creep may be described using a model that contains a minimum of 3 experimentally determined parameters in a generic equation. The parameters may be functions of other parameters or numbers including unity, depending on the fit to experimental data. The effective uniaxial strain rate may be related to the effective stress a by the function $$\dot{\varepsilon} = \dot{\gamma}\left(\frac{\sigma}{\sigma^*}\right)^n \quad (10)$$

where $\dot{\gamma}$ is a reference strain rate, $\sigma^*$ is a reference stress, and n is a stress exponent. These parameters may be functions of temperature, yield strength, hardness, etc. The effective uniaxial strain rate, $\dot{\bar{\varepsilon}}$ may be related to the strain rate tensor, $\dot{\varepsilon}$, by the equation $$\dot{\varepsilon} = \dot{\bar{\varepsilon}}\frac{3S}{2\bar{\sigma}} \quad (11)$$

where S represents the stress deviator. Equations (10) and (11) may be used to model the thermal creep $\dot{\varepsilon}_c^{th}$, the irradiation creep $\dot{\varepsilon}_c^{ir}$, and/or the viscoplastic creep $\dot{\varepsilon}_c^{vp}$.

The thermal creep model assumes steady-state power law creep, with the exception that thermal creep depends in part on the level of irradiation damage. Irradiation creep occurs as high-energy neutrons impinge on the cladding layer 26 and displace cladding particles. The term viscoplasticity is reserved for the material flow behavior at strain rates that are on the order of those typically used in tensile tests (e.g., on the order of $10^{-3}$ s$^{-1}$, etc.). The flow behavior, in some cases, is a function of stress, temperature, and irradiation damage.

Irradiation-induced stress-free swelling has three salient features: (i) an incubation dose is required before swelling is initiated; (ii) after incubation, swelling increases approximately linearly with dose; and (iii) post-incubation swelling rates are temperature sensitive. Based on these features, the stress-free welling strain rate takes the following form $$\dot{\varepsilon}_c^{swell} = \frac{1}{3}\dot{\gamma}_{sw}f(T)h(x)(R - R_{incubation})\left(\frac{\dot{R}}{\dot{R}_o}\right)\delta \quad (12)$$

where $\dot{\gamma}_{sw}$ is the stress-free swelling reference strain rate, R is the irradiation dose, $R_{incubation}$ is the incubation irradiation dose, $\dot{R}$ is the irradiation dose rate, $\dot{R}_o$ is the reference dose rate, h(x) is the Heaviside step function, and f(T) is a function of temperature.

Unlike most other constitutive models, the cladding model of the present disclosure includes a term that accounts for the effects of stress state on swelling rate, as opposed to assuming that the swelling results in an enhancement of irradiation creep. The application of a tensile stress results in an increase in the swelling rate past the incubation dose. Given that hydrostatic stress is the work-conjugate to volumetric swelling, the strain rate associated with stress-enhanced swelling takes the form $$\dot{\varepsilon}_c^{se} = \frac{1}{3}\dot{\gamma}_{se}f(T)h(x)(R - R_{incubation})\left(\frac{\dot{R}}{\dot{R}_o}\right)\left(\frac{\sigma_H}{\sigma_{se}}\right)\delta \quad (13)$$

where $\dot{\gamma}_{se}$ is the linear stress-enhanced swelling creep reference strain rate, $\sigma_{se}$ is the linear stress-enhanced swelling creep reference stress, and $\sigma_H$ is the hydrostatic stress.

Finite Element Analysis

Figure 5:
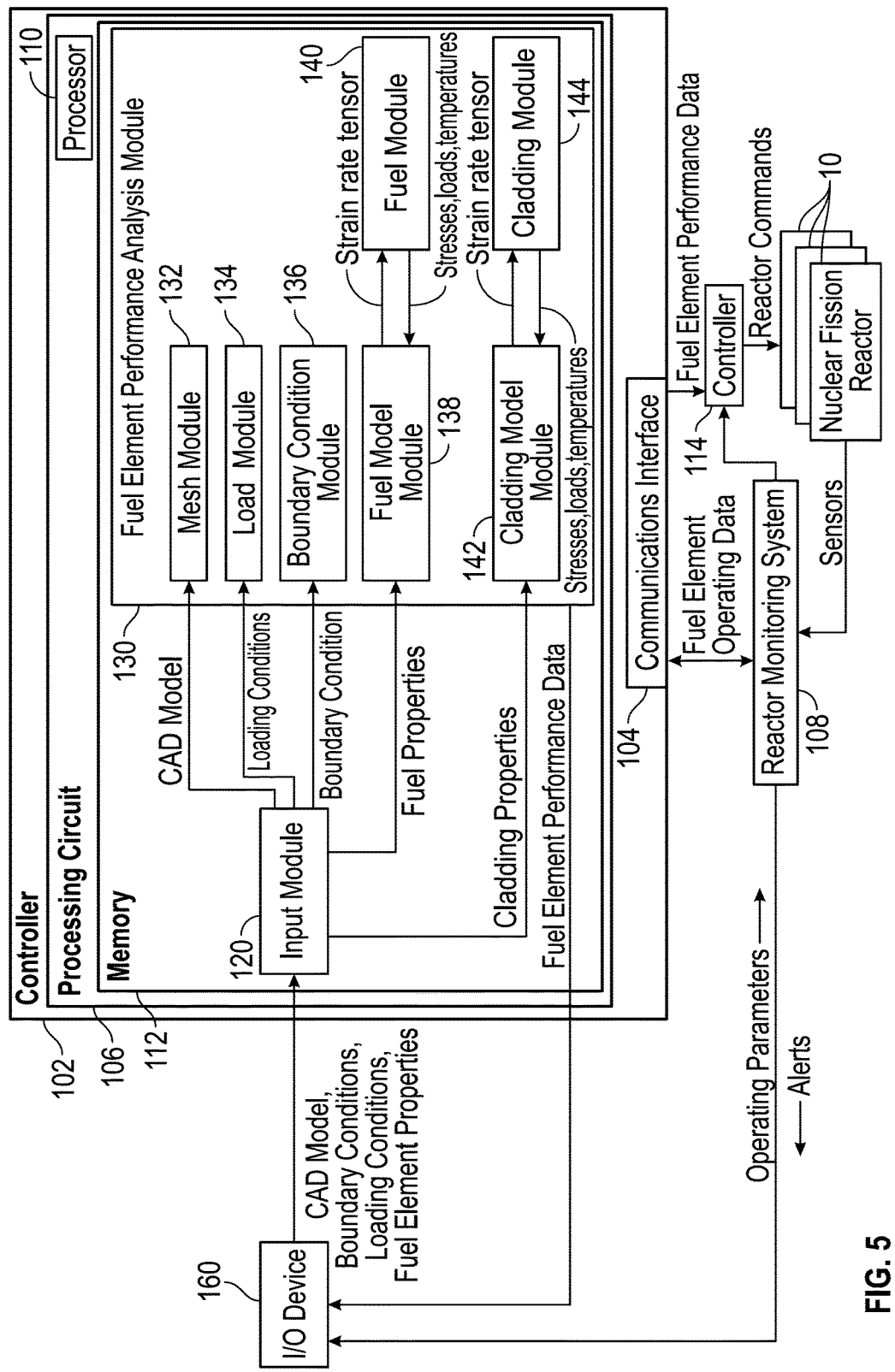
FIG. 5 is a schematic illustration of a fuel element analysis system including a processor that may be used to estimate the thermo-mechanical performance of a fuel element, according to one embodiment.

Referring now to FIG. 5, a schematic diagram of a fuel element analysis system 100 is shown, according to one embodiment. The fuel element analysis system 100 is shown to include a controller 102. In one embodiment, the controller 102 is communicably coupled to an input/output (I/O) device 160. Additionally or alternatively, fuel element analysis system 100 includes a reactor monitoring system 108 and a reactor controller 114. As shown in FIG. 5, the reactor monitoring system 108 and/or the reactor controller 114 are communicably coupled to at least one nuclear fission reactor 10. The nuclear fission reactor 10 may be the same as previously described with reference to FIG. 1, such as a traveling wave reactor. According to an example embodiment, the fuel element analysis system 100 is or is part of a finite element system. In one embodiment, the fuel element analysis system 100 is used to predict the thermo-mechanical performance of a fuel element, such as the fuel element 22. Additionally or alternatively, the fuel element analysis system 100 receives data (e.g., fuel element operating data, etc.) from the reactor monitoring system 108 regarding at least one nuclear fission reactor 10 to monitor the performance of the fuel elements 22 of the respective nuclear fission reactor(s) 10. In other embodiments, the fuel element analysis system 100 may include and/or receive data/inputs from another source.

The controller 102 is shown to include a communications interface 104. The communications interface 104 may include wired or wireless interfaces (e.g., jacks, antennas, transmitters, receivers, transceivers, wire terminals, etc.) for conducting data communications with various systems, devices, or networks. For example, the communications interface 104 may include an Ethernet card and port for sending and receiving data via an Ethernet-based communications network and/or a WiFi transceiver for communicating via a wireless communications network. The communications interface 104 may be configured to communicate via local area networks or wide area networks (e.g., the Internet, a building WAN, etc.) and may use a variety of communications protocols (e.g., BACnet, IP, LON, etc.).

The communications interface 104 may be a network interface configured to facilitate electronic data communications between the controller 102 and various external systems or devices (e.g., the reactor monitoring system 108, the nuclear fission reactors 10, the reactor controller 114, the I/O device 160, etc.). By way of example, the controller 102 may receive one or more inputs from the I/O device 160. By way of another example, the controller 102 may receive data (e.g., information, fuel element operating data, etc.) from the reactor monitoring system 108 indicating one or more operating conditions of the nuclear fission reactor 10 (e.g., temperature, loads, etc.) and/or the fuel elements 22 (e.g., temperature, strain, stress, etc.).

Still referring to FIG. 5, the controller 102 includes a processing circuit 106. As shown in FIG. 5, the processing circuit 106 includes a processor 110. The processor 110 may be a general purpose or specific purpose processor, an application specific integrated circuit (ASIC), one or more field programmable gate arrays (FPGAs), a digital signal processor (DSP), a group of processing components, or other suitable processing components. The processor 110 may be configured to execute computer code or instructions stored in a memory 112 or received from other computer readable media (e.g., CDROM, network storage, a remote server, etc.). The memory 112 may include one or more devices (e.g., memory units, memory devices, storage devices, etc.) for storing data and/or computer code for completing and/or facilitating the various processes described in the present disclosure. The memory 112 may include random access memory (RAM), read-only memory (ROM), hard drive storage, temporary storage, non-transient volatile memory or non-volatile memory, flash memory, optical memory, or any other suitable memory for storing software objects and/or computer instructions. The memory 112 may include database components, object code components, script components, or any other type of information structure for supporting the various activities and information structures described in the present disclosure. The memory 112 may be communicably connected to the processor 110 via the processing circuit 106 and may include computer code for executing (e.g., by the processor 110, etc.) one or more processes described herein.

As shown in FIG. 5, the memory 112 includes various modules for completing the activities described herein. More particularly, the memory 112 includes modules configured to determine the thermo-mechanical performance of the fuel element 22. While various modules with particular functionality are shown in FIG. 5, it should be understood that the controller 102 and the memory 112 may include any number of modules for completing the functions described herein. For example, the activities of multiple modules may be combined as a single module, as additional modules with additional functionality may be included, etc. Further, it should be understood that the controller 102 may further control other activity beyond the scope of the present disclosure.

Certain operations of the controller 102 described herein include operations to interpret and/or to determine one or more parameters/models. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

As shown in FIG. 5, the controller 102 includes an input module 120. The input module 120 may be communicably coupled to the I/O device 160 and is configured to receive one or more inputs from a user of the fuel element analysis system 100. The I/O device 160 enables the user of the fuel element analysis system 100 to communicate with the fuel element analysis system 100 and the controller 102. By way of example, the I/O device 160 may include, but is not limited to, an interactive display, a touchscreen device, one or more buttons and switches, voice command receivers, a keyboard, etc. In one embodiment, the I/O device 160 includes a graphical user interface (GUI). Via the I/O device 160, the user may input various parameters and/or data regarding the fuel element 22. For example, the parameters and/or data may include material properties of the cladding layer 26, material properties of the fuel slugs 28, boundary conditions for the fuel element 22, a desired time step between iterations of a finite element method, a computer-aided design (CAD) file of the fuel element 22, and the like.

Referring still to FIG. 5, the controller 102 includes a fuel element performance analysis module 130. The fuel element performance analysis module 130 is configured to perform a performance analysis on the fuel element 22 to estimate the mechanical behavior of the fuel slugs 28 and the creep and swelling behavior of the cladding layer 26 based on various parameters. The parameters may include a fuel model, a cladding model, and various inputs (e.g., from the input module 120, etc.). The inputs may include, but not limited to, a CAD file/model of the fuel element 22, mechanical and/or thermal boundary conditions for the fuel element 22, initial loading conditions, a desired time step, convergence tolerances, a mesh element type, a mesh element size, and the like. The initial loading conditions and boundary conditions may constrain some degrees of freedom, which may allow for unique solutions to the differential equations used in the finite element analysis or may provide the inputs to closed form solutions or other numerical methods other than finite element analysis.

As shown in FIG. 5, the fuel element performance analysis module 130 includes a mesh module 132. The mesh module 132 is configured to generate a mesh for a model (e.g., CAD model, etc.) of the fuel element 22 defining a plurality of elements. Referring now to FIGS. 7A-7B, a model of the fuel element 22 (e.g., a CAD model, etc.) is shown before and after the mesh module 132 generates a mesh for the fuel element 22. As shown in FIG. 7B, the mesh module 132 generates a meshed fuel element 40. The meshed fuel element 40 includes a cladding mesh 50 for the cladding layer 26 and a fuel mesh 60 for the fuel slugs 28 of the fuel element 22. The cladding mesh 50 discretizes the cladding layer 26 into a plurality of connected elements 52, each comprised of nodes 54. Similarly, the fuel mesh 60 discretizes the fuel slugs 28 into a plurality of elements 62, each comprised of nodes 64. As shown in FIG. 7B, the element 52 and the elements 62 that make up the meshed fuel element 40 are tetrahedron in shape. In other embodiments, the meshed fuel element 40 may include any type of geometry discretization (e.g., surface elements, another three-dimensional shape, etc.). By way of example, the elements 52 and/or the elements 62 may have an axisymmetric geometry or be quadrilateral in shape. In some embodiments, the elements 52 have a different geometry than the elements 62. The differing geometry may help identify the elements 52 of the cladding mesh 50 from the elements 62 of the fuel mesh 60 during the fuel element performance analysis of the fuel element 22 by the fuel element analysis system 100. According to an example embodiment, the elements 52 and/or the elements 62 are designed by a user of the fuel element analysis system 100 and inputted into the mesh module 132. In other embodiments, the elements 52 and/or the elements 62 are chosen from predefined elements within fuel element analysis system 100. The type of element may effectively describe the type of differential equation to be solved (e.g., solid mechanics, heat transfer diffusion, etc.) and the degrees of freedom (e.g., of displacement, of temperature, etc.) for the fuel element 22.

Referring still to FIG. 5, the fuel element performance analysis module 130 includes a load module 134 and a boundary condition module 136. The load module 134 is configured to receive initial loading conditions regarding the fuel slugs 28 and/or cladding layer 26. The load module 134 is also configured to receive updates for the loading conditions after each iteration of the fuel element performance analysis. The boundary condition module 136 is configured to receive boundary conditions regarding the fuel slugs 28 and/or cladding layer 26. In one embodiment, the loading and boundary conditions are for thermal and mechanical variables of a thermo-mechanical model for the fuel slugs 28 (may also be referred to as a thermo-displacement model). Additionally or alternatively, the loading and boundary conditions include thermal and mechanical variables of a thermo-mechanical model for the cladding layer 26. The loading and boundary conditions may aid in reducing the number of degrees of freedom and minimizing the number of unknowns within the fuel and/or cladding models.

Referring again to FIG. 5, the fuel element performance analysis module 130 runs a supervisory routine to build a global stiffness matrix (e.g., an elastic stiffness tensor such as $C_c$ or $C_f$, etc.) describing stiffness parameters (e.g., Young's modulus, Poisson's ratio, etc.) for every element (e.g., the elements 52, the elements 62, etc.) of the meshed fuel element 40 defined during the mesh generation of the finite element analysis. The fuel element performance analysis module 130 is configured to estimate the mechanical behavior of the fuel slugs 28 and the creep and swelling of the cladding layer 26 by performing an analysis across each element of the meshed fuel element 40 based on at least one of the global stiffness matrix, the boundary conditions, the loading conditions, the cladding model, and the fuel model.

As shown in FIG. 5, the fuel element performance analysis module 130 includes a fuel model module 138 and a fuel module 140. The fuel model module 138 is communicably coupled to the input module 120 such that properties (e.g., pore volume fraction, material properties, thermal expansion coefficient, material composition, fission gas properties, etc.) of the fuel slugs 28 may be received from a user of the fuel element analysis system 100. In some embodiments, the properties of the fuel slugs 28 may be predefined and stored within the memory 112. In such a case, a user may be able to select a fuel and the properties regarding that fuel, which in turn load from within the fuel model module 138 or another part of the memory 112. By way of example, the fuel model module 138 may include a variety of information structures used to define the properties of the fuel slugs 28. The information structures may include, but not limited to, look-up tables, relational databases, neural networks, decision matrices, node trees, mathematical algorithms, and the like. Additionally or alternatively, the fuel model module 138 includes or is configured as compiled software, a set of functions executed in a certain order, and/or a set of recursive functions, among others alternatives. The fuel model module 138 is configured to receive the fuel properties regarding the fuel slugs 28 to model the performance of the fuel slugs 28. Additionally or alternatively, Equations (1)-(5) may be stored within the fuel model module 138. The fuel model module 138 may use the fuel properties and Equations (1)-(5) to model the mechanical behavior of the fuel slugs 28 and define the strain rate tensor for the fuel slugs 28.

Figure 6:
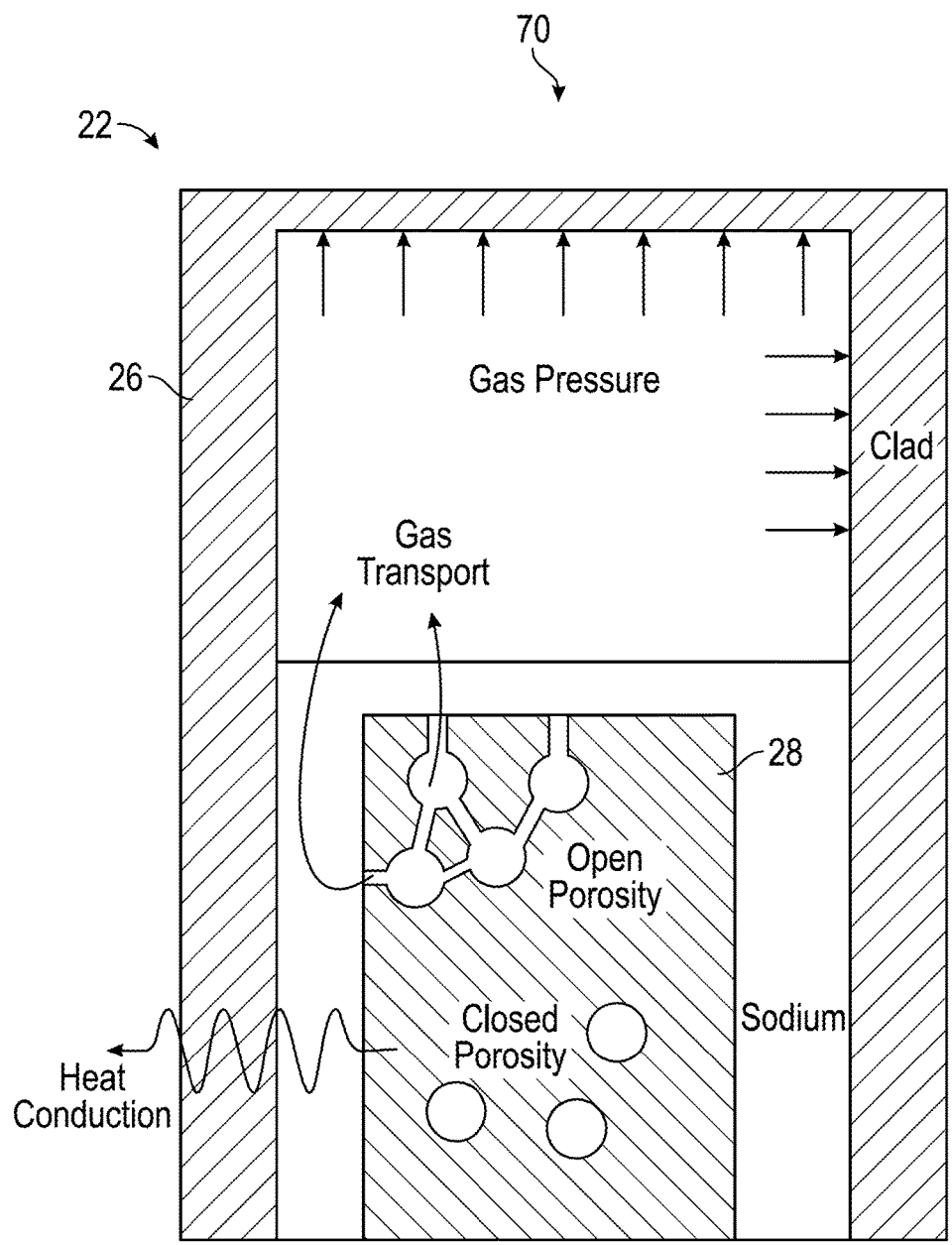
FIG. 6 is an illustration of a fuel model depicting the behavior of a fuel within a fuel element, according to one embodiment.

Referring now to FIG. 6, an illustration of a fuel model 70 for a fuel element, such as the fuel element 22, is shown. In one embodiment, the fuel model module 138 models the mechanical behavior of the fuel slugs 28 to account for the constitutive behavior of a porous solid (e.g., a porous fuel, etc.). As shown in FIG. 6, the porous fuel slugs 28 may include at least one of an open porosity component and a closed porosity component. In some embodiments, the fuel model 70 further accounts for the release of fission gas pressure and the transfer of thermal energy from the fuel slugs 28 to a coolant (e.g., liquid sodium, etc.) and/or the cladding layer 26. In still other embodiments, the fuel model 70 accounts for irradiation and thermal creep of the fuel slugs 28. The fuel model 70 may be used by the fuel module 140 to estimate the mechanical behavior of the fuel slugs 28, as is described more fully herein.

The fuel model module 138 is configured to define the strain rate tensor for both the open and closed porosity component of the fuel slugs 28. The fuel model module 138 may use a model for porosity homogenization to do so. The model for porosity homogenization creates separate variables for the open porosity and closed porosity components of the fuel slugs 28. After separating the open and closed porosity portions, the fuel model module 138 and the fuel module 140 perform a routine for both the open porosity and the closed porosity components. The fuel model module 138 estimates the strain rate tensor and derivatives based on the fuel properties, the initial loading, stresses, boundary conditions, and the like. Direct strains due to thermal expansion and solid fission product swelling are calculated. For the creep mechanisms, the stains are calculated for each of the strain tensor components.

The fuel module 140 is configured to receive the strain rate tensor for both the open and closed porosity components of the fuel slugs 28 (i.e., the fuel model, etc.) from the fuel model module 138. The fuel module 140 estimates the mechanical behavior of the fuel slugs 28 based on the strain rate tensors from the model for porosity homogenization. As part of the routine, if implemented by finite element analysis, the fuel module 140 estimates a local stress tensor at the end of a predefined increment/iteration (e.g., a user defined increment, a preset increment, etc.) for the fuel slugs 28. The fuel module 140 processes the current state of the fuel slugs 28 and updates the current state and stresses or forces for the fuel slugs 28 or due to the fuel slugs 28 based on the fission gas release for a current iteration of the analysis. For example, the fission gas pressure may be calculated based on either closed porosity or open porosity. For closed porosity, the fission gas pressure is based on the density of the fuel slugs 28 and local temperature. For open porosity, the fission gas pressure is based on the total gas atoms in the total open porosity volume, the plenum temperature, and the total open porosity volume. Open porosity volume may be estimated based on the initial open volume, the fission gas release, and the solid fission products which may be determined by the average burn-up. Alternative methods of estimating open porosity fission gas pressure may also be used.

Additionally, the fuel module 140 defines porosity and its derivatives. An implicit method (e.g., a Newton-Raphson Method, etc.) or explicit method (e.g., a forward Euler's Method, etc.) may be used to estimate the local stress tensor or forces due to the fuel at the end of the predefined increment and the defined strain rate tensor and porosity. For example, an iterative method may determine the change in fuel parameters between two consecutive iterations within a given increment in time. The process, as explained above, may be performed in a loop such that the process continues until the difference between solution approximations of two consecutive iterations is less than some exit criteria (e.g., a solution convergence threshold, etc.). If the solution convergence criteria are met, the solution approximations are accepted. If the number of iterations becomes substantially excessive (e.g., greater than an iterations threshold, greater than a time threshold, etc.), it is assumed that the solution cannot be solved (i.e., the solution appears to be diverging, etc.) or solved efficiently and the initial parameters may be refined. Alternatively, an explicit increment of parameters could be used where the values at the end of the time increment are accepted without iteration.

Once the exit criteria are met, in the context of finite element analysis, the determined changes (e.g., solution approximations, etc.) are utilized by the fuel module 140 to form a Jacobian matrix. The Jacobian matrix is formed based on the derivatives of the strain rate with respect to stress and porosity and the constitutive matrix for the fuel slugs 28 (e.g., Equation (2), etc.), weighted by fission gas release. The Jacobian matrix, the updated stresses, and updated state variables (e.g., porosity, pressure, strain rate, etc.) for the fuel slugs 28 are returned for the weighted combination and subsequent passing to the fuel element performance analysis module 130. The Jacobian matrix, the current state, and stresses for the fuel from the processing of the open and closed porosity components are combined according to a weighting. The weighting is governed by a fission gas release parameter (e.g., the gas release fraction F, etc.).

Referring back to FIG. 5, the fuel element performance analysis module 130 include a cladding model module 142 and a cladding module 144. In one embodiment, the cladding model module 142 is communicably coupled to the input module 120 such that properties (e.g., material properties, thermal expansion coefficient, material composition, etc.) of the cladding layer 26 may be received from a user of the fuel element analysis system 100. In some embodiments, the properties of the cladding layer 26 may be predefined and stored within the memory 112. In such a case, a user may be able to select a material of the cladding layer 26 and the properties regarding that cladding material load from within the cladding model module 142. By way of example, the cladding model module 142 may include a variety of information structures used to define the properties of the cladding layer 26 and model the performance thereof. The information structures may include, but not limited to, look-up tables, relational databases, neural networks, decision matrices, node trees, mathematical algorithms, and the like. Additionally or alternatively, the cladding model module 142 includes or is configured as compiled software, a set of functions executed in a certain order, and/or a set of recursive functions, among others alternatives. Additionally, Equations (6)-(13) may be stored within the cladding model module 142. The cladding model module 142 may use the cladding properties and Equations (6)-(13) to model the creep and swelling of the cladding layer 26 and define the strain rate tensor and derivatives for the cladding layer 26. The cladding model may be used by the cladding module 144 to estimate the creep and swelling of the cladding layer 26, as is described more fully herein.

The cladding model module 142 and the cladding module 144 perform a routine to estimate the creep and swelling of the cladding layer 26. The cladding module 144 is configured to estimate the creep and swelling behavior of the cladding layer 26, using the cladding model (e.g., Equations (6)-(13), etc.), the loading (e.g., pressure, stress, temperature, etc.), and the strain tensor for the cladding layer 26. The creep and swelling behavior of the cladding layer 26 is calculated by summing the contributing strain rates associated with a plurality of deformation parameters. The plurality of deformation parameters include creep and swelling behavior induced by viscoplastic strain, thermal creep strain, irradiation creep strain, stress-enhanced swelling strain, stress-free swelling strain, and thermal expansion strain.

The cladding module 144 is configured to receive the strain tensor, or an effective creep strain increment and volumetric strain increment, and its derivatives for the plurality of deformation parameters experienced by the cladding layer 26. The cladding module 144 estimates a local stress tensor at the end of a predefined increment/iteration for the cladding layer 26. The cladding module 144 processes the current state of the cladding layer 26 and updates the current state and stresses or forces for the cladding layer 26. The estimate of the local stress tensor at the end of the predefined increment and the defined strain rate tensor or strain increments are passed to an implicit or explicit method to determine changes in cladding parameters over the predefined increment. In an implicit method, if the solution convergence criteria is met, the solution approximations are accepted. If the number of iterations becomes substantially excessive, it is assumed that the solution cannot be solved and the parameters may be refined. Once the exit criteria is met, the determined changes (e.g., solution approximations, etc.) may be utilized to form a Jacobian matrix. The Jacobian matrix is formed based on the derivatives of the strain rate with respect to stress and the constitutive matrix for the cladding layer 26 (e.g., Equation (8), etc.). The Jacobian matrix, the updated stresses, and updated state variables (e.g., pressure, strain rate, etc.), and/or clad strain for the cladding layer 26 are then passed to the fuel element performance analysis module 130, depending on the implementation.

The fuel element performance analysis module 130 receives the Jacobian matrix, the updated stresses, and/or the updated state variables for both the cladding layer 26 and the fuel slugs 28, thereby facilitating the running and completion of the finite element analysis or other method. Resulting data (e.g., fuel element performance data, etc.) that describes the thermo-mechanical performance of the fuel element 22 and the fuel design based on the fuel element performance analysis may be communicated to the I/O device 160. The resulting data may allow a user of the fuel element analysis system 100 to quantify the performance of the designed fuel element 22 and set or analyze design values and design requirements based on the results data. In some embodiments, the fuel element analysis system 100 determines whether design constraints have been satisfied by the resulting data. The design constraints may be preset or user-defined via the I/O device 160. By way of example, if the fuel element performance data conveys that the loading on the fuel elements 22 may cause substantial distortion and/or dimensional changes, a different fuel element design may be explored. For example, the thickness of the cladding layer 26 or material properties of the cladding material may be changed, or the timing of when the nuclear fuel assemblies 20 are shuffled around the nuclear fission reactor core 12 during their lifetime may be adjusted.

In an alternative embodiment, the input module 120 is configured to receive alerts from the reactor monitoring system 108 regarding real-time performance of the nuclear fission reactors 10 and the fuel elements 22, as mentioned above. The reactor monitoring system 108 may be configured to monitor conditions within a nuclear fission reactor 10, such as the operating conditions of the fuel elements 22. By way of example, the reactor monitoring system 108 may receive an input from various sensors (e.g., temperature sensors, strain gauges, pressure sensors, etc.) distributed throughout the nuclear fission reactor 10 and/or about the fuel elements 22. The input may include fuel element operating data regarding the current state and operating conditions of the fuel elements 22. In one embodiment, the I/O device 160 is configured to facilitate the setting of operating parameters for the nuclear fission reactors 10 and/or the fuel elements 22. In other embodiments, the operating parameters are preset within the reactor monitoring system 108. The operating parameters may include temperature thresholds, pressure thresholds, strain thresholds, and/or stress thresholds, among others. The reactor monitoring system 108 may determine that the fuel elements 22 or the nuclear fission reactor 10 are approaching operating levels that indicate failure or undesired operating conditions responsive to the fuel element operating data based on the operating parameters. In this case, the reactor monitoring system 108 may notify a user via the I/O device 160 with an alert, such as a warning message or indicator lamp. The alert may include information such as to add fuel the fuel elements 22, remove fuel from the fuel elements 22, add/remove/replace fuel elements 22, and/or shuffle the nuclear fuel assemblies 20 around the nuclear fission reactor core 12.

In other embodiments, the controller 102 may monitor the status/state of the fuel elements 22 and/or the nuclear fission reactors 10 using the fuel element operating data received from the reactor monitoring system 108. The fuel element operating data may indicate thermal loads, mechanical loads, distortion/damage, and the like regarding the fuel elements 22. The controller 102 may be configured to estimate the expected life of the fuel elements 22 based on thermal and mechanical loads applied to the fuel elements 22. Additionally or alternatively, the controller 102 determines whether or not the fuel elements 22 may have been damaged, thereby facilitating the determination of whether one or more fuel elements 22 may need to be replaced. In one embodiment, the controller 102 determines and communicates fuel element performance data (e.g., based on the fuel element operating data, etc.) to the I/O device 160 to notify/inform an operator regarding the current operating conditions and estimated performance over the lifetime of the fuel elements 22. Additionally or alternatively, the controller 102 may communicate estimates of how much additional energy may be extracted from the fuel elements 22. For example, while remaining within regulated operating conditions, additional energy may be extracted by running the nuclear fission reactors 10 at a higher burn-up cycle.

In other embodiments, the communications interface 104 transmits the fuel element performance data determined by the controller 102 to the reactor controller 114. The reactor controller 114 is configured to provide reactor commands to the nuclear fission reactors 10 based on the fuel element performance data. In one embodiment, the reactor controller 114 provides a command to an actuator based on the fuel element performance data. The command may instruct the actuator to add fuel the fuel elements 22, remove fuel from the fuel elements 22, add/remove fuel elements 22, and/or shuffle the nuclear fuel assemblies 20 around the nuclear fission reactor core 12. The actuator may be or control an in-vessel handling system. Additionally or alternatively, the reactor controller 114 may generate on/off commands for the nuclear fission reactors 10 based on the fuel element performance data regarding the fuel elements 22 and the operating parameters set by an operator of the I/O device 160 or preset within the reactor monitoring system 108. In some embodiments, the reactor monitoring system 108 and/or the reactor controller 114 are local to an individual nuclear fission reactor 10. In other embodiments, the reactor monitoring system 108 and/or the reactor controller 114 are a part of a global system that monitors a plurality of nuclear reactors 10. According to an example embodiment, the controller 102 is integrated within a single computer (e.g., one server, one housing, etc.). In various other embodiments, the controller 102 may be distributed across multiple servers or computers. In another example embodiment, the controller 102 may be combined with the reactor monitoring system(s) 108 and/or the controller(s) 114.

Illustrative Methods

FIGS. 8A-8I and 9 are a series of flowcharts depicting implementations. For ease of understanding, the flowcharts are organized such that the initial flowcharts present implementations via an example implementation and thereafter the following flowcharts present other implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIGS. 8A-8I provide illustrative flow diagrams for a method for modeling reactor fuel element and fuel design to determine the thermo-mechanical performance thereof, shown as method 800, according to one embodiment. Although the method is presented as a sequence of steps for illustrative purposes, this sequence does not limit the scope of the claimed methods, and those of ordinary skill in the art will be aware of modifications and variations that may be made to the sequence.

Figure 8A:
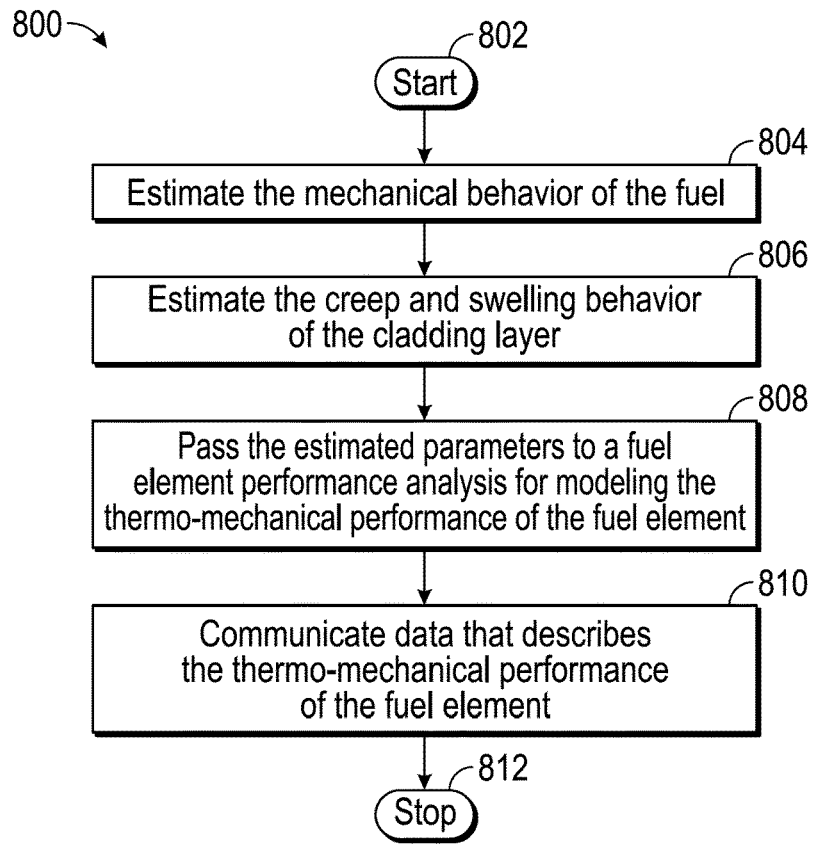
FIGS. 8A-8I are schematic diagrams of a method for modeling reactor fuel element and fuel design to determine the thermo-mechanical performance thereof, according to one embodiment.

Referring to FIG. 8A, method 800 starts at block 802. At block 804, the fuel element analysis system 100 estimates the mechanical behavior of the fuel. At block 806, the fuel element analysis system 100 estimates the creep and swelling behavior of the cladding layer. At block 808, the estimated parameters are passed to a fuel element performance analysis for modeling thermo-mechanical performance of the fuel element. At block 810, the fuel element analysis system 100 communicates the data that describes the thermo-mechanical performance of the fuel element based on the fuel element performance analysis. In one embodiment, method 800 stops at block 812. In other embodiments, method 800 continues. Additional method steps are set forth below by way of non-limiting example.

Figure 8B:
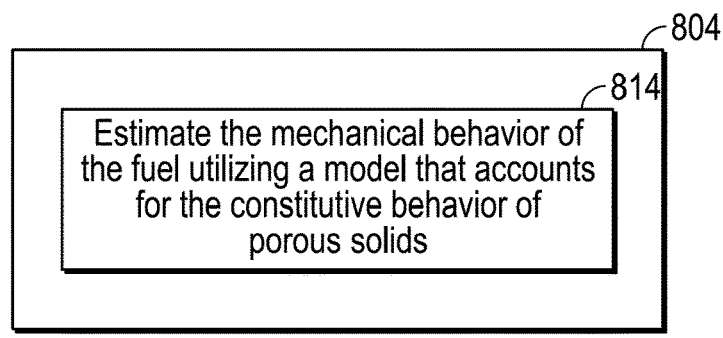
Figure 8C:
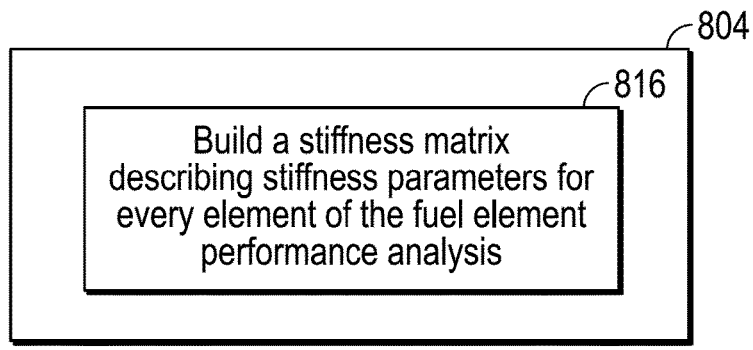
Figure 8D:
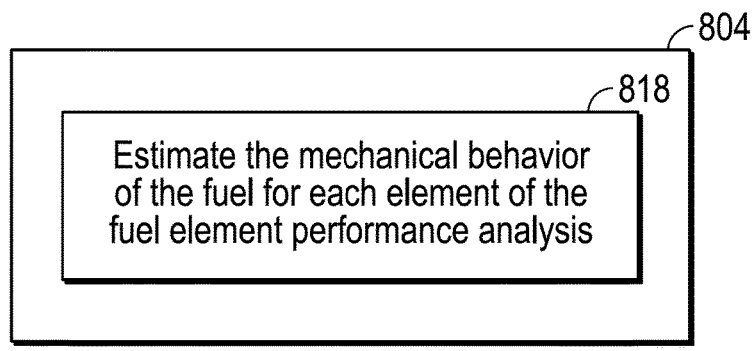
Figure 8E:
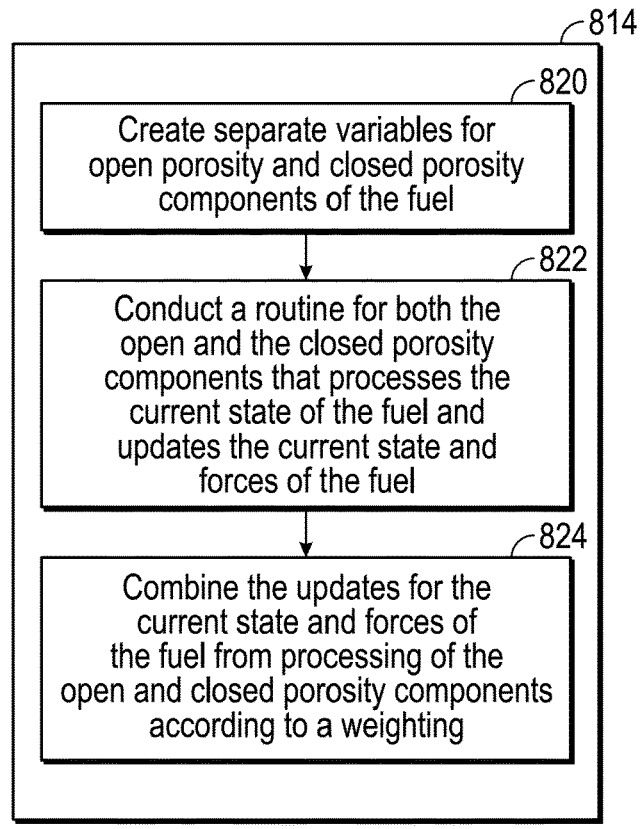
Figure 8F:
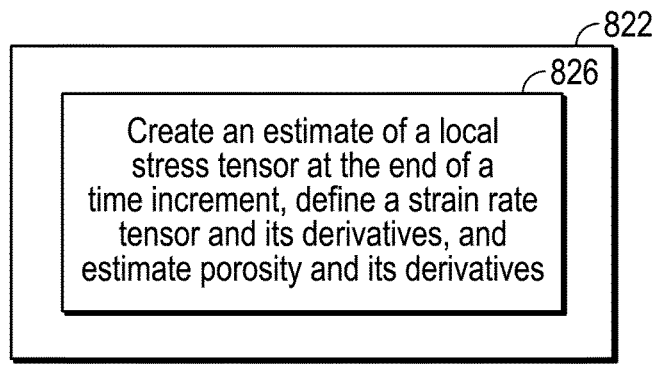
Figure 8G:
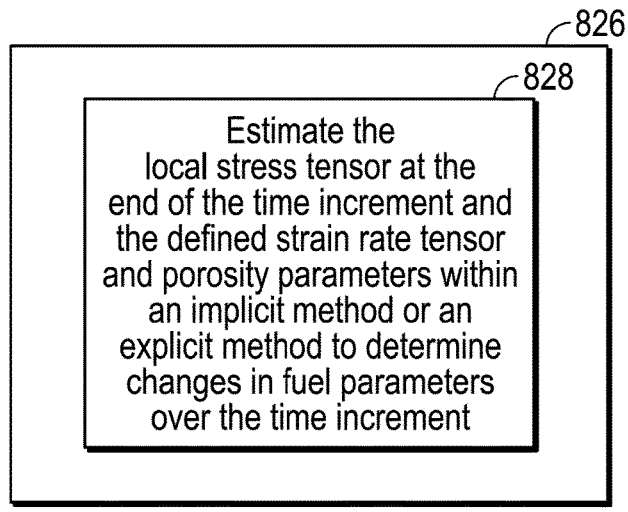
Figure 8H:
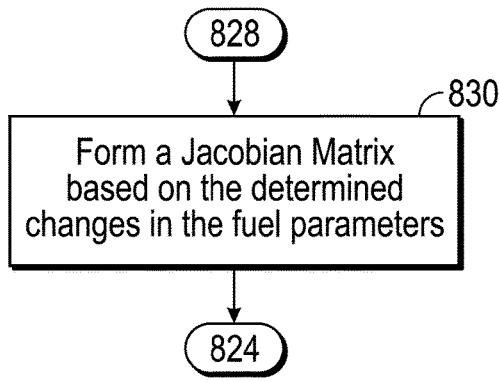
Figure 8I:
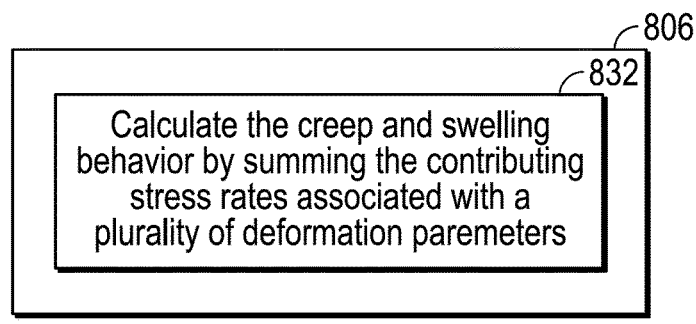

Referring to FIG. 8B, in some embodiments, estimating the mechanical behavior of the fuel includes estimating the mechanical behavior of the fuel utilizing a model that accounts for the constitutive behavior of porous solids with open and closed porosity components at block 814. Referring to FIG. 8C, in some embodiments, estimating the mechanical behavior of the fuel includes building a stiffness matrix describing the stiffness parameters (e.g., Young's modulus, Poisson's ratio, etc.) for every element of the fuel element performance analysis at block 816. Referring to FIG. 8D, in some embodiments, estimating the mechanical behavior of the fuel includes estimating the mechanical behavior of the fuel for each element of the fuel element performance analysis at block 818. Referring to FIG. 8E, in some embodiments, estimating the mechanical behavior of the fuel utilizing a model that accounts for the constitutive behavior of porous solids with open and closed porosity components includes creating separate variable for the open porosity and the closed porosity components of the fuel at block 820, conducting a routine for both the open porosity and the closed porosity fuel components that processes the current state of the fuel and updates the current state and forces of each of the open porosity and closed porosity component of the fuel at block 822, and combining the updates for the current state and forces of the fuel from the processing of the open and closed porosity components according to a weighting at block 824. The weighting may be governed by a fission gas release parameter. Additionally, the combined states and stress for the fuel are returned to the fuel element performance analysis. Referring to FIG. 8F, in some embodiments, conducting the routine for processing the current state of the fuel includes creating an estimate of a local stress tensor at the end of a time increment, defining a strain rate tensor and its derivatives, and estimating porosity and its derivatives at block 826. Referring to FIG. 8F, in some embodiments, conducting the routine for processing the current state of the fuel includes creating an estimate of the forces imposed by the fuel element. Referring to FIG. 8G, in some embodiments, estimating the local stress tensor at the end of the time increment and the defined stain rate tensor and porosity parameters are estimated within an implicit method or an explicit method to determine changes in fuel parameters over the time increment at block 828. Referring to FIG. 8H, the determined changes in the fuel parameters are utilized to form a Jacobian matrix of the fuel model at block 830, and at least one of the Jacobian matrix, the updated stresses, and updated state variables are returned for the weighted combination and subsequent passing to the fuel element performance analysis. Referring to FIG. 8I, in some embodiments, estimating the creep and swelling behavior of the cladding layer includes calculating the creep and swelling behavior by summing the contributing stress rates associated with a plurality of deformation parameters at block 832.

In some embodiment, the fuel element analysis system 100 receives a model of a fuel element (e.g., a CAD model of the fuel element 22, etc.) and parameters regarding the fuel element. As described above, a user may input various parameters via the I/O device 160 such as boundary conditions, material properties, initial loading conditions, and the like. With the model of the fuel element and the parameters, the fuel element analysis system 100 models the mechanical behavior of a fuel (e.g., the fuel slugs 28, etc.) and/or the creep and swelling of a cladding layer of the fuel element. Additionally, the fuel element analysis system 100 generates a mesh for the fuel element, discretizing the fuel element into regions (i.e., elements, etc.) comprised of nodes.

Figure 9:
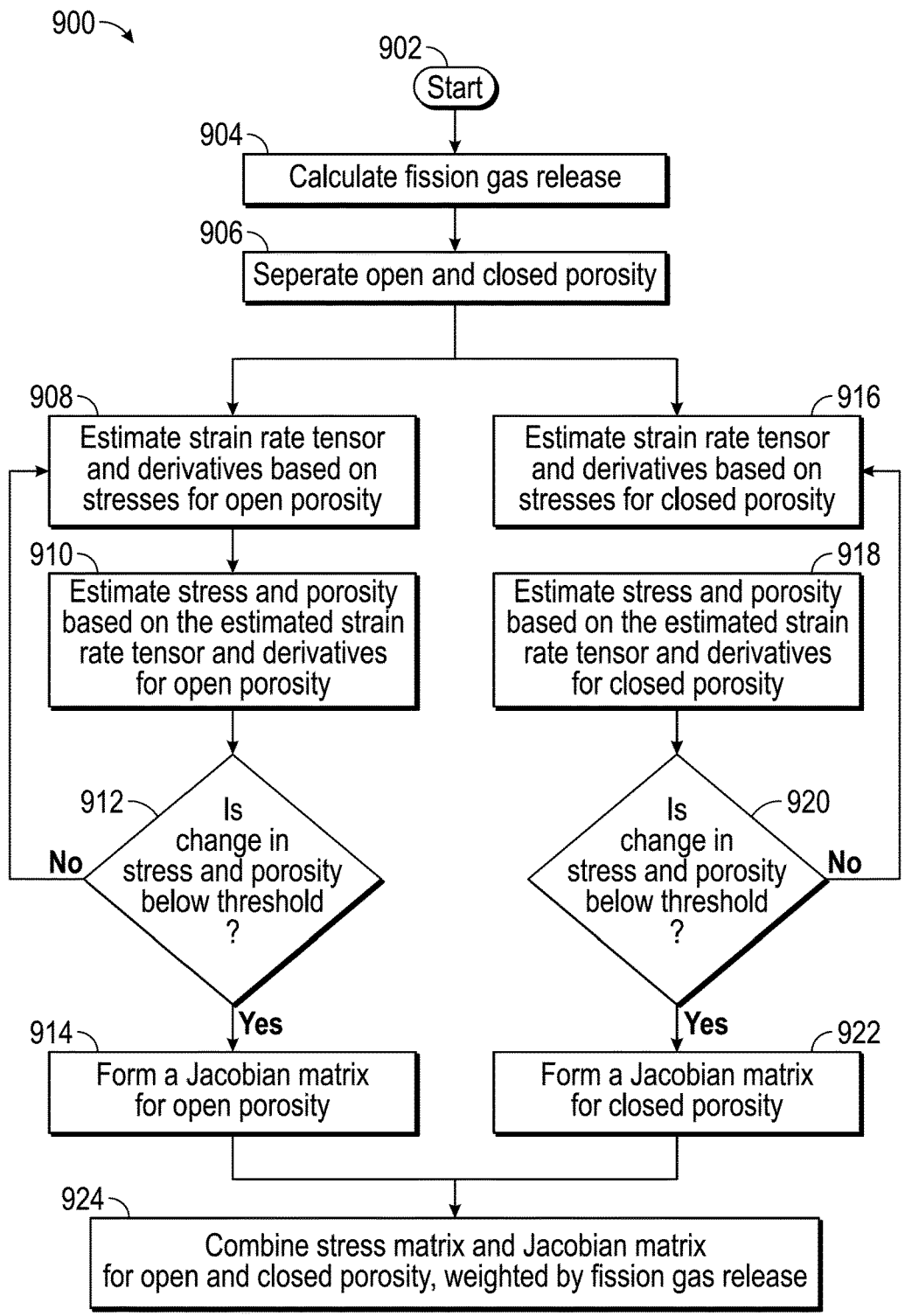
FIG. 9 is a schematic diagram of a method for estimating the mechanical behavior of a fuel of a fuel element, according to one embodiment.

FIG. 9 provides an illustrative flow diagram for a method for estimating the mechanical performance of the fuel of a fuel element, shown as method 900, according to one embodiment. Although the method is presented as a sequence of steps for illustrative purposes, this sequence does not limit the scope of the claimed methods, and those of ordinary skill in the art will be aware of modifications and variations that may be made to the sequence.

Referring to FIG. 9, method 900 starts at block 902. At block 904, the fuel element analysis system 100 calculates the fission gas release of a fuel. At block 906, the fuel element analysis system 100 separates the open and closed porosity component of the fuel. At block 908, the fuel element analysis system 100 estimates a strain rate tensor and derivatives based on the initial stresses for the open porosity component of the fuel. At block 910, the fuel element analysis system 100 estimates the stress and porosity of the fuel based on the estimated strain rate tensor and derivatives for the open porosity component of the fuel. At block 912, the fuel element analysis system 100 determines if the change in stress and porosity for the open porosity component of the fuel during for the first iteration is below an exit criteria threshold. The fuel element analysis system 100 repeats steps 908-912, updating the stresses in the open porosity component each iteration until the exit criteria threshold is satisfied (e.g., the change in stress and porosity between iterations is less than the exit criteria threshold, etc.). When the exit criteria threshold is met, the fuel element analysis system 100 forms a Jacobian matrix for the open porosity component of the fuel (block 914).

At block 916, the fuel element analysis system 100 estimates a strain rate tensor and derivatives based on the initial stresses for the closed porosity component of the fuel. At block 918, the fuel element analysis system 100 estimates the stress and porosity of the fuel based on the estimated strain rate tensor and derivatives for the closed porosity component of the fuel. At block 920, the fuel element analysis system 100 determines if the change in stress and porosity for the closed porosity component of the fuel during the first iteration is below an exit criteria threshold. The fuel element analysis system 100 repeats steps 916-920, updating the stresses in the closed porosity component each iteration until the exit criteria threshold is satisfied (e.g., the change in stress and porosity between iterations is less than the exit criteria threshold, etc.). When the exit criteria threshold is met, the fuel element analysis system 100 forms a Jacobian matrix for the closed porosity component of the fuel (block 922). At block 924, the fuel element analysis system 100 combines a stress matrix and the Jacobian matrix for each of the open and closed porosity components of the fuel, weighted by a fission gas release parameter based on the calculated fission gas release. After block 924, the fuel element analysis system 100 may use the combined matrix to estimate the mechanical behavior of the fuel of the fuel element.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computerized system for modeling reactor fuel element and fuel design to determine the thermo-mechanical performance thereof, comprising:

a processor coupled to memory, the memory configuring the processor to execute a fuel element performance analysis, the processor configured to:

estimate a mechanical behavior of a model of a fuel element having open porosity and closed porosity components by (a) creating separate variables, within the model, for the open porosity and the closed porosity components of the fuel element, (b) conducting a computer-based simulation for both the open porosity and the closed porosity components that processes a current state of the model of the fuel element and generates one or more updates associated with the current state of the model including forces of each of the open porosity and the closed porosity components of the model, and (c) combining the one or more updates for the current state of the model including the forces acting on the model of the fuel element from the processing of the open porosity and the closed porosity components according to a weighting between the open porosity and closed porosity components; and estimate a creep and a swelling behavior of a model of a cladding of the fuel element, the model of the cladding including estimated parameters wherein the estimated parameters are utilized in the fuel element performance analysis;

an output that communicates data that describes the thermo-mechanical performance of the reactor fuel element and fuel design based on the fuel element performance analysis;

a communications interface that sends, to a reactor controller, at least a portion of the data that describes the thermo-mechanical performance of the reactor fuel element and fuel design based on the fuel element performance analysis; and the reactor controller that controls an operating nuclear reactor based on the at least a portion of the data.

2. The computerized system of claim 1, wherein the mechanical behavior of the model of the fuel element is estimated utilizing a model that accounts for the constitutive behavior of the fuel element with the open porosity and the closed porosity components.

3. The computerized system of claim 1, wherein the weighting is governed by a fission gas release parameter.

4. The computerized system of claim 1, wherein a supervisory routine of the system builds a stiffness matrix describing stiffness parameters for every element of the fuel element performance analysis.

5. The computerized system of claim 4, wherein the processor is configured to conduct the estimate of the mechanical behavior of the model of the fuel element for each element of the fuel element performance analysis.

6. The computerized system of claim 5, wherein the computer-based simulation for processing the current state of the fuel element creates an estimate of a local stress tensor at the end of a time increment, defines a strain rate tensor and its derivatives, and estimates porosity and its derivatives.

7. The computerized system of claim 6, wherein the estimate of the local stress tensor at the end of the time increment and the defined strain rate tensor and porosity parameters are estimated within an implicit method or an explicit method to determine changes in fuel parameters over the time increment.

8. The computerized system of claim 7, wherein the determined changes are utilized to form a Jacobian matrix of a model, and wherein at least one of the Jacobian matrix, the updated stresses, and updated state variables are returned for the weighted combination.

9. The computerized system of claim 1, wherein the creep and the swelling behavior of the cladding is calculated by summing the contributing strain rates associated with a plurality of deformation parameters.

10. The computerized system of claim 1, wherein the reactor fuel element and fuel design is altered based on fuel element performance data from the fuel element performance analysis indicating a design constraint has not been met.

11. The computerized system of claim 1, wherein the processor is configured to receive fuel element operating data regarding the fuel element, wherein the processor determines the fuel element needs to be replaced, removed, repaired, or shuffled based on the fuel element operating data.

12. The computerized system of claim 11, wherein the processor is configured to determine fuel element performance data based on the fuel element operating data, wherein the fuel element performance data includes an indication of an amount of additional energy that is able to be extracted from the fuel element.

13. A computerized method for modeling reactor fuel element and fuel design to determine the thermo-mechanical performance thereof, comprising:

estimating (a) a mechanical behavior of a model of a fuel element, and (b) a creep and a swelling behavior of a model of a cladding;

passing estimated parameters to a fuel element performance analysis for modeling the reactor fuel element and fuel design;

wherein the estimate of the mechanical behavior of the model of the fuel element comprises:

creating, within the model of the fuel element, separate variables for open porosity and closed porosity components of the fuel element, conducting a computer-based simulation for both the open porosity and the closed porosity components of the model of the fuel element that processes a current state of the model of the fuel element and generates one or more updates associated with the current state including forces of each of the open porosity and the closed porosity components of the fuel element, and combining the one or more updates for the current state including the forces of the fuel element from the processing of the open porosity and the closed porosity components according to a weighting, wherein the combined state and forces of the fuel element are calculated;

the method further comprising:

communicating data that describes the thermo-mechanical performance of the reactor fuel element and fuel design based on the fuel element performance analysis;

communicating, to a reactor controller, at least a portion of the data that describes the thermo-mechanical performance of the reactor fuel element and fuel design based on the fuel element performance analysis; and controlling, by the reactor controller, an operating nuclear reactor based on the at least a portion of the data.

14. The computerized method of claim 13, further comprising building a stiffness matrix describing stiffness parameters for every element of the fuel element performance analysis.

15. The computerized method of claim 14, further comprising conducting the estimate of the mechanical behavior of the model of the fuel element for each element of the fuel element performance analysis, wherein the fuel element performance analysis is a finite element analysis.

16. The computerized method of claim 13, wherein the weighting is governed by a fission gas release parameter.

17. The computerized method of claim 13, wherein the computer-based simulation for processing the current state of the fuel element creates an estimate of a local stress tensor at the end of a time increment, defines a strain rate tensor and its derivatives, and estimates porosity and its derivatives.

18. The computerized method of claim 17, wherein the estimate of the local stress tensor at the end of the time increment and the defined strain rate tensor and porosity parameters are estimated within an implicit method or an explicit method to determine changes in fuel parameters over the time increment.

19. The computerized method of claim 18, wherein the determined changes are utilized to form a Jacobian matrix of a model, and wherein at least one of the Jacobian matrix, the updated stresses, and updated state variables are returned for the weighted combination and subsequent passing to the fuel element performance analysis.

20. The computerized method of claim 13, wherein the creep and the swelling behavior of the cladding is calculated by summing the contributing strain rates associated with a plurality of deformation parameters.

21. The computerized system of claim 1, wherein the communications interface is further configured to receive fuel element operating data from a reactor monitoring system that is adapted to monitor the operating nuclear reactor, wherein the processor is further adapted to update the model of the fuel element responsive to the received fuel element operating data.

22. The computerized method of claim 13, further comprising receiving fuel element operating data from a reactor monitoring system that is adapted to monitor the operating nuclear reactor and updating the model of the fuel element responsive to the received fuel element operating data.

* * * * *